United States Patent
Jain et al.

(10) Patent No.: US 7,668,762 B2
(45) Date of Patent: Feb. 23, 2010

(54) SUPPLY CHAIN MANAGEMENT SYSTEM DETERMINING WHETHER ORDERS RELATED TO A FAMILY OF PRODUCTS CAN BE PROMISED

(75) Inventors: Rajeev Jain, Ladnun (IN); Saurabh Surendra, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 1308 days.

(21) Appl. No.: 10/727,525

(22) Filed: Dec. 5, 2003

(65) Prior Publication Data

US 2005/0097011 A1    May 5, 2005

(30) Foreign Application Priority Data

Nov. 3, 2003    (IN)    ............ 890/CHE/2003

(51) Int. Cl.
G06F 17/50    (2006.01)
(52) U.S. Cl. .......................... 705/29; 705/28
(58) Field of Classification Search ............. 705/28–29
See application file for complete search history.

(56) References Cited

U.S. PATENT DOCUMENTS

| | | | |
|---|---|---|---|
| 5,515,269 A * | 5/1996 | Willis et al. ................... 705/29 |
| 5,771,172 A | 6/1998 | Yamamoto et al. |
| 5,854,746 A | 12/1998 | Yamamoto et al. |
| 5,914,878 A | 6/1999 | Yamamoto et al. |
| 6,393,332 B1 * | 5/2002 | Gleditsch et al. ............. 700/99 |
| 6,957,190 B1 * | 10/2005 | Sakayori et al. ............... 705/16 |
| 6,963,847 B1 * | 11/2005 | Kennedy et al. ............... 705/8 |
| 7,065,499 B1 * | 6/2006 | Seth et al. ...................... 705/26 |
| 7,212,976 B2 * | 5/2007 | Scheer ......................... 705/1 |
| 7,216,086 B1 * | 5/2007 | Grosvenor et al. ............ 705/7 |
| 7,379,905 B2 * | 5/2008 | Beebe et al. .................. 705/28 |
| 7,496,530 B2 * | 2/2009 | Cheng et al. .................. 705/28 |
| 2002/0072986 A1 * | 6/2002 | Aram ........................... 705/26 |
| 2002/0095307 A1 * | 7/2002 | Greamo et al. ................ 705/1 |
| 2002/0107763 A1 * | 8/2002 | Palmer et al. ................. 705/29 |
| 2002/0188499 A1 * | 12/2002 | Jenkins et al. ................ 705/10 |
| 2004/0019538 A1 * | 1/2004 | Ballas et al. .................. 705/29 |

* cited by examiner

*Primary Examiner*—Ramsey Refai
(74) *Attorney, Agent, or Firm*—Narendra Reddy Thappeta

(57) ABSTRACT

A supply chain management system processing orders related to a family of products. An user may provide a parameter referred to as 'aggregate time fence' (ATF) duration representing an amount of advance time duration after which aggregate supply of all member items is available to satisfy the demand for any member item. For illustration, if an order for a member item is received with a required date being after the ATF duration, the order can be promised even if the required quantity of the first member item is not scheduled to be available at of the required date, provided sufficient number of units of other member items are scheduled to be available as of the requested date. Thus, orders are promised taking advantage of similarities in resource requirements of member items.

80 Claims, 14 Drawing Sheets

| Items | | Day1 | Day2 | Day3 | Day4 | Day5 | Day6 | Day7 | Day8 |
|---|---|---|---|---|---|---|---|---|---|
| Family | Family Supply | 20 | 20 | 20 | 20 | 20 | 20 | 20 | 20 |
| | Family Bucketed allocation | | | | | | 0 | 0 | 0 |
| | Net Family Available | | | | | | 20 | 20 | 20 |
| | Backward Consumption | | | | | | 0 | 0 | 0 |
| | Net + B/W | | | | | | 20 | 20 | 20 |
| | Forward Consumption | | | | | | 0 | 0 | 0 |
| | Present family availability | | | | | | 20 | 20 | 20 |
| Member-A | Item Supply -A | 10 | 10 | 10 | 10 | 10 | | | |
| | Item-A demand | 0 | 0 | 0 | 0 | 0 | | | |
| | Item-A Bucketed Allocation | 0 | 0 | 0 | 0 | 0 | | | |
| | Net Item-A Available | 10 | 10 | 10 | 10 | 10 | | | |
| | Backward Consumption | 0 | 0 | 0 | 0 | 0 | | | |
| | Net + B/W | 10 | 10 | 10 | 10 | 10 | | | |
| | Forward Consumption | 0 | 0 | 0 | 0 | 0 | | | |
| | Present Item-A availability | 10 | 10 | 10 | 10 | 10 | | | |
| | Cumulative item-A availability | 10 | 20 | 30 | 40 | 50 | 70 | 90 | 110 |
| Member-B | Item Supply -B | 10 | 10 | 10 | 10 | 10 | | | |
| | Item-B demand | 0 | 0 | 0 | 0 | 0 | | | |
| | Item-B Bucketed Allocation | 0 | 0 | 0 | 0 | 0 | | | |
| | Net Item-B Available | 10 | 10 | 10 | 10 | 10 | | | |
| | Backward Consumption | 0 | 0 | 0 | 0 | 0 | | | |
| | Net + B/W | 10 | 10 | 10 | 10 | 10 | | | |
| | Forward Consumption | 0 | 0 | 0 | 0 | 0 | | | |
| | Present Item-B availability | 10 | 10 | 10 | 10 | 10 | | | |
| | Cumulative Item-B availability | 10 | 20 | 30 | 40 | 50 | 70 | 90 | 110 |

| Items | | Day1 | Day2 | Day3 | Day4 | Day5 | Day6 | Day7 | Day8 |
|---|---|---|---|---|---|---|---|---|---|
| Family | Family Supply | 20 | 20 | 20 | 20 | 20 | 20 | 20 | 20 |
| | Family Bucketed allocation | | | | | | 0 | 0 | 0 |
| | Net Family Available | | | | | | 20 | 20 | 20 |
| | Backward Consumption | | | | | | 0 | 0 | 0 |
| | Net + B/W | | | | | | 20 | 20 | 20 |
| | Forward Consumption | | | | | | 0 | 0 | 0 |
| | Present family availability | | | | | | 20 | 20 | 20 |
| Member-A | Item Supply -A | 10 | 10 | 10 | 10 | 10 | | | |
| | Item-A demand | 0 | 0 | 0 | 0 | 0 | | | |
| | Item-A Bucketed Allocation | 0 | 0 | 0 | 0 | 0 | | | |
| | Net Item-A Available | 10 | 10 | 10 | 10 | 10 | | | |
| | Backward Consumption | 0 | 0 | 0 | 0 | 0 | | | |
| | Net + B/W | 10 | 10 | 10 | 10 | 10 | | | |
| | Forward Consumption | 0 | 0 | 0 | 0 | 0 | | | |
| | Present Item-A availability | 10 | 10 | 10 | 10 | 10 | | | |
| | Cumulative Item-A availability | 10 | 20 | 30 | 40 | 50 | 70 | 90 | 110 |
| Member-B | Item Supply -B | 10 | 10 | 10 | 10 | 10 | | | |
| | Item-B demand | 0 | 0 | 0 | 0 | 0 | | | |
| | Item-B Bucketed Allocation | 0 | 0 | 0 | 0 | 0 | | | |
| | Net Item-B Available | 10 | 10 | 10 | 10 | 10 | | | |
| | Backward Consumption | 0 | 0 | 0 | 0 | 0 | | | |
| | Net + B/W | 10 | 10 | 10 | 10 | 10 | | | |
| | Forward Consumption | 0 | 0 | 0 | 0 | 0 | | | |
| | Present Item-B availability | 10 | 10 | 10 | 10 | 10 | | | |
| | Cumulative Item-B availability | 10 | 20 | 30 | 40 | 50 | 70 | 90 | 110 |

*FIG. 5*

| Items | | Day1 | Day2 | Day3 | Day4 | Day5 | Day6 | Day7 | Day8 |
|---|---|---|---|---|---|---|---|---|---|
| Family | Family Supply | 20 | 20 | 20 | 20 | 20 | 20 | 20 | 20 |
| | Family Bucketed allocation | | | | | | 0 | 0 | 0 |
| | Net Family Available | | | | | | 20 | 20 | 20 |
| | Backward Consumption | | | | | | 0 | 0 | 0 |
| | Net + B/W | | | | | | 20 | 20 | 20 |
| | Forward Consumption | | | | | | 0 | 0 | 0 |
| | Present family availability | | | | | | 20 | 20 | 20 |
| Member-A | Item Supply-A | 10 | 10 | 10 | 10 | 10 | | | |
| | Item-A demand | 0 | 0 | 30 | 0 | 0 | | | |
| | Item-A Bucketed Allocation | 0 | 0 | 30 | 0 | 0 | | | |
| | Net Item-A Available | 10 | 10 | -20 | 10 | 10 | | | |
| | Backward Consumption | -10 | -10 | +20 | 0 | 0 | | | |
| | Net + B/W | 0 | 0 | 0 | 10 | 10 | | | |
| | Forward Consumption | 0 | 0 | 0 | 0 | 0 | | | |
| | Present Item-A availability | 0 | 0 | 0 | 10 | 10 | | | |
| | Cumulative item-A availability | 0 | 0 | 0 | 10 | 20 | 40 | 60 | 80 |
| Member-B | Item Supply-B | 10 | 10 | 10 | 10 | 10 | | | |
| | Item-B demand | 0 | 0 | 0 | 0 | 0 | | | |
| | Item-B Bucketed Allocation | 0 | 0 | 0 | 0 | 0 | | | |
| | Net Item-B Available | 10 | 10 | 10 | 10 | 10 | | | |
| | Backward Consumption | 0 | 0 | 0 | 0 | 0 | | | |
| | Net + B/W | 10 | 10 | 10 | 10 | 10 | | | |
| | Forward Consumption | 0 | 0 | 0 | 0 | 0 | | | |
| | Present Item-B availability | 10 | 10 | 10 | 10 | 10 | | | |
| | Cumulative item-B availability | 10 | 20 | 30 | 40 | 50 | 70 | 90 | 110 |

*FIG. 6A*

| Items | | Day1 | Day2 | Day3 | Day4 | Day5 | Day6 | Day7 | Day8 |
|---|---|---|---|---|---|---|---|---|---|
| Family | Family Supply | 20 | 20 | 20 | 20 | 20 | 20 | 20 | 20 |
| | Family Bucketed allocation | | | | | | 0 | 0 | 0 |
| | Net Family Available | | | | | | 20 | 20 | 20 |
| | Backward Consumption | | | | | | 0 | 0 | 0 |
| | Net + B/W | | | | | | 20 | 20 | 20 |
| | Forward Consumption | | | | | | 0 | 0 | 0 |
| | Present family availability | | | | | | 20 | 20 | 20 |
| Member-A | Item Supply -A | 10 | 10 | 10 | 10 | 10 | | | |
| | Item-A demand | 0 | 0 | 30 | 0 | 0 | | | |
| | Item-A Bucketed Allocation | 0 | 0 | 30 | 0 | 0 | | | |
| | Net Item-A Available | 10 | 10 | -20 | 10 | 10 | | | |
| | Backward Consumption | -10 | -10 | +20 | 0 | 0 | | | |
| | Net + B/W | 0 | 0 | 0 | 10 | 10 | | | |
| | Forward Consumption | 0 | 0 | 0 | 0 | 0 | | | |
| | Present Item-A availability | 0 | 0 | 0 | 10 | 10 | | | |
| | Cumulative item-A availability | 0 | 0 | 0 | 10 | 20 | 40 | 60 | 80 |
| Member-B | Item Supply -B | 10 | 10 | 10 | 10 | 10 | | | |
| | Item-B demand | 0 | 20 | 0 | 0 | 0 | | | |
| | Item-B Bucketed Allocation | 0 | 20 | 0 | 0 | 0 | | | |
| | Net Item-B Available | 10 | -10 | 10 | 10 | 10 | | | |
| | Backward Consumption | -10 | +10 | 0 | 0 | 0 | | | |
| | Net + B/W | 0 | 0 | 10 | 10 | 10 | | | |
| | Forward Consumption | 0 | 0 | 0 | 0 | 0 | | | |
| | Present Item-B availability | 0 | 0 | 10 | 10 | 10 | | | |
| | Cumulative item-B availability | 0 | 0 | 10 | 20 | 30 | 50 | 70 | 90 |

*FIG. 6B*

| | Items | Day1 | Day2 | Day3 | Day4 | Day5 | Day6 | Day7 | Day8 |
|---|---|---|---|---|---|---|---|---|---|
| Family | Family Supply | 20 | 20 | 20 | 20 | 20 | 20 | 20 | 20 |
| | Family Bucketed allocation | | | | | | 0 | 40 | 35(15) |
| | Net Family Available | | | | | | 20 | -20 | -15 |
| | Backward Consumption | | | | | | -20 | +20 | 0 |
| | Net + B/W | | | | | | 0 | 0 | -15 |
| | Forward Consumption | | | | | | 0 | 0 | +15 |
| | Present family availability | | | | | | 0 | 0 | 0 |
| Member-A | Item Supply -A | 10 | 10 | 10 | 10 | 10 | | | |
| | Item-A demand | 0 | 0 | 30 | 0 | 0 | | 50 | |
| | Item-A Bucketed Allocation | 0 | 0 | 30 | 0 | 10 | | | |
| | Net Item-A Available | 10 | 10 | -20 | 10 | 0 | | | |
| | Backward Consumption | -10 | -10 | +20 | 0 | 0 | | | |
| | Net + B/W | 0 | 0 | 0 | 10 | 0 | | | |
| | Forward Consumption | 0 | 0 | 0 | -10 | 0 | | | |
| | Present Item-A availability | 0 | 0 | 0 | 0 | 0 | | | |
| | Cumulative Item-A availability | 0 | 0 | 0 | 10 | 10 | 10 | 10 | 10 |
| Member-B | Item Supply -B | 10 | 10 | 10 | 10 | 10 | | | |
| | Item-B demand | 0 | 20 | 0 | 0 | 0 | | | 65 |
| | Item-B Bucketed Allocation | 0 | 20 | 0 | 0 | 30 | | | |
| | Net Item-B Available | 10 | -10 | 10 | 10 | -20 | | | |
| | Backward Consumption | -10 | +10 | -10 | 0 | +20 | | | |
| | Net + B/W | 0 | 0 | 0 | 10 | 0 | | | |
| | Forward Consumption | 0 | 0 | 0 | -10 | 0 | | | |
| | Present Item-B availability | 0 | 0 | 0 | 0 | 0 | | | |
| | Cumulative Item-B availability | 0 | 0 | 0 | 0 | 0 | 0 | 0 | 0 |

FIG. 8

| Items | | Day1 | Day2 | Day3 | Day4 | Day5 | Day6 | Day7 | Day8 |
|---|---|---|---|---|---|---|---|---|---|
| Family | Family Supply | 20 | 20 | 20 | 20 | 20 | 20 | 20 | 20 |
| | Family Bucketed allocation | | | | | | (10) | 40 | 35(15) |
| | Net Family Available | | | | | | 10 | -20 | -15 |
| | Backward Consumption | | | | | | -10 | +10 | 0 |
| | Net + B/W | | | | | | 0 | -10 | -15 |
| | Forward Consumption | | | | | | 0 | +10 | 15 |
| | Present family availability | | | | | | 0 | 0 | 0 |
| Member-A | Item Supply -A | 10 | 10 | 10 | 10 | 10 | | | |
| | Item-A demand | 20 | 0 | 30 | 0 | 0 | | 50 | |
| | Item-A Bucketed Allocation | 10 | 0 | 30 | 0 | 10 | | | |
| | Net Item-A Available | 0 | 10 | -20 | 10 | 0 | | | |
| | Backward Consumption | 0 | -10 | 10 | 0 | 0 | | | |
| | Net + B/W | 0 | 0 | -10 | 10 | 0 | | | |
| | Forward Consumption | 0 | 0 | 10 | -10 | 0 | | | |
| | Present Item-A availability | 0 | 0 | 0 | 0 | 0 | | | |
| | Cumulative item-A availability | 0 | 0 | 0 | 0 | 0 | 0 | 0 | 0 |
| Member-B | Item Supply -B | 10 | 10 | 10 | 10 | 10 | | | |
| | Item-B demand | 0 | 20 | 0 | 0 | 30 | | | 65 |
| | Item-B Bucketed Allocation | 0 | 20 | 0 | 0 | -20 | | | |
| | Net Item-B Available | 10 | -10 | 10 | 10 | +20 | | | |
| | Backward Consumption | -10 | +10 | -10 | 0 | 0 | | | |
| | Net + B/W | 0 | 0 | 0 | 0 | 0 | | | |
| | Forward Consumption | 0 | 0 | 0 | 0 | 0 | | | |
| | Present Item-B availability | 0 | 0 | 0 | 0 | 0 | | | |
| | Cumulative item-B availability | 0 | 0 | 0 | 0 | 0 | 0 | 0 | 0 |

*FIG. 9*

| Items | | Day1 | Day2 | Day3 | Day4 | Day5 | Day6 | Day7 | Day8 |
|---|---|---|---|---|---|---|---|---|---|
| Family | Family Supply | 20 | 20 | 20 | 20 | 20 | 20 | 20 | 20 |
| | Family Bucketed allocation | | | | | | 0 | 40 | 35(15) |
| | Net Family Available | | | | | | 20 | -20 | -15 |
| | Backward Consumption | | | | | | -20 | 20 | 0 |
| | Net + B/W | | | | | | 0 | 0 | -15 |
| | Forward Consumption | | | | | | 0 | 0 | 15 |
| | Present family availability | | | | | | 0 | 0 | 0 |
| Member-A | Item Supply -A | 10 | 10 | 10 | 10 | 10 | | 50 | |
| | Item-A demand | 20 | 0 | 0 | 0 | 0 | | | |
| | Item-A Bucketed Allocation | 20 | 0 | 0 | 0 | 10 | | | |
| | Net Item-A Available | -10 | 10 | 10 | 10 | 0 | | | |
| | Backward Consumption | 0 | 0 | 0 | 0 | 0 | | | |
| | Net + B/W | -10 | 10 | 10 | 10 | 0 | | | |
| | Forward Consumption | 10 | -10 | 0 | 0 | 0 | | | |
| | Present Item-A availability | 0 | 0 | 10 | 10 | 0 | | | |
| | Cumulative Item-A availability | 0 | 0 | 10 | 20 | 20 | 20 | 20 | 20 |
| Member-B | Item Supply -B | 10 | 10 | 10 | 10 | 10 | | | 65 |
| | Item-B demand | 0 | 20 | 0 | 0 | 0 | | | |
| | Item-B Bucketed Allocation | 0 | 20 | 0 | 0 | 30 | | | |
| | Net Item-B Available | 10 | -10 | 10 | 10 | -20 | | | |
| | Backward Consumption | -10 | +10 | -10 | -10 | +20 | | | |
| | Net + B/W | 0 | 0 | 0 | 0 | 0 | | | |
| | Forward Consumption | 0 | 0 | 0 | 0 | 0 | | | |
| | Present Item-B availability | 0 | 0 | 0 | 0 | 0 | | | |
| | Cumulative Item-B availability | 0 | 0 | 0 | 0 | 0 | 0 | 0 | 0 |

FIG. 10

SUPPLY CHAIN MANAGEMENT SYSTEM DETERMINING WHETHER ORDERS RELATED TO A FAMILY OF PRODUCTS CAN BE PROMISED

RELATED APPLICATION

The present application claims priority from pending Indian patent application entitled, "Supply Chain Management System Determining Whether Orders Related to a Family of Products Can be Promised", Serial number: 890/CHE/2003, Filing date: Nov. 3, 2003, naming Jain et al as inventors.

BACKGROUND OF THE INVENTION

1. Field of the Invention

The present invention relates to digital processing systems implemented to support supply chain management, and more specifically to a method and apparatus for determining whether orders related to a family of products can be promised.

2. Related Art

Supply chain management (SCM) systems generally refer to digital processing systems which enable one to plan/determine the availability of various products at the right time, in the right place, and in right condition. SCM systems are often used in manufacturing plants to reduce inventories at various levels, i.e., components used to build products, products shipped to the next party (e.g., retailer) in the supply chain, etc., as is well known in the relevant arts.

One common application of SCM systems is to determine whether an order can be promised or not. As an illustration, a purchaser may wish to purchase 1000 units to be delivered on a specific future date, and the SCM system may need to indicate whether the quantity and delivery date requirements can be met based on the status of availability of various resources (e.g., components), and the time required at each stage to produce the product from the available resources.

Manufacturing operations often produce a family of products. A family of products generally refers to a group of products which share similarities in terms of resource requirements. For example, an operation may manufacture Pepsi, Mirinda, and Sprite (each product being referred to as a member of the family), which use similar components such as bottles of same shape, caps of same physical makeup (but with different label/color towards the end), liquid, etc. In general, the components share similar features to some extent, but could differ (e.g., in color, logo, etc.) depending on the specific member in which the components are used.

It may be desirable that a SCM system take advantage of such commonalities in determining whether orders can be promised or not.

SUMMARY

An aspect of the present invention enables orders for member items of a family of products to be promised by taking advantage of similarities in resource requirements of member items. In an embodiment, a computer system (digital processing system) is operable to receive a time fence (TF) duration associated with each member item in relation to a first member item. The TF duration represents an amount of advance time duration after which the supply of the corresponding member item is available to satisfy the demand for said first member item.

In one implementation, the TF duration is equal for all pairs of member items and is referred to as aggregate time fence (ATF). The ATF duration is then used to promise orders potentially based on aggregate availability of all member items (family of member items) in the post-ATF duration.

For illustration, it is assumed that a first order is received specifying a first quantity of the first member item and a first required date, wherein the first required date is after the ATF duration from a time the first order is received, and wherein only Qavail units of the first member item are scheduled to be available as of the first required date, wherein Qavail is less than the first quantity. The computer system determines whether at least the first quantity of all of the member items (including the first member item) is scheduled to be available as of the first required date. If such quantity is available, the computer system promises the first order.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings briefly described below.

FIG. 5 is shown containing a table illustrating the status of different variables before receiving a first order assuming there are only two member items in a family of products.

FIG. 6A is shown containing a table illustrating the status of different variables after a first order for a first member item is promised, with the first order having a required date before the ATF point.

FIG. 6B is shown containing a table illustrating the status of different variables after a second order for a second member item is promised, with the second order also having a required date before the ATF point.

FIG. 8 is shown containing a table illustrating the status of different variables after a fourth order for a second member item is promised, with the fourth order having a required date after the ATF point, and with the required quantity not being scheduled to be available on the required date.

FIG. 9 is shown containing a table illustrating the status of different variables after a fifth order for a first member item is accepted, with the fifth order having a required date before the ATF point, and with the required quantity not being scheduled to be available on the required date.

FIG. 10 is shown containing a table illustrating the processing of an order, promised earlier using units (of a member item) which are scheduled to be available within ATF duration, which is now unscheduled.

DETAILED DESCRIPTION OF THE PREFERRED EMBODIMENTS

1. Overview

According to an aspect of the present invention, a digital processing system (hereafter "SCM system") supporting supply chain management (SCM) determines whether an order related to a family of products can be promised. An user may provide a parameter referred to as 'aggregate time fence' (ATF) duration representing an amount of advance time duration after which aggregate supply of all member items is available to satisfy the demand for any member item. In other words, without such advance notice, it may not be possible to change course so as to manufacture units of the another member item using the units of the one member item already in the process of being manufactured.

Thus, when the desired quantity of a member item is not available as of a requested date (which is after the ATF duration) specified in an order, the SCM system examines the aggregate of scheduled supplies of all member items on the requested date, and indicates that the order can be promised if the desired quantity of the member item can be supplied using such available supplies (of all the member items). As a result, an aspect of the present invention takes advantage of the similarity of resource requirements/usage of the members of the family to efficiently use all the available units of the members of the family to promise orders.

Another aspect of the present invention pre-computes data representing the aggregate quantity available for all members of the family each day after the ATF point (i.e., the day after the ATF duration from a present day). Such pre-computed data enables a SCM system to quickly determine whether orders can be processed. The resulting features are particularly useful in environments in which a large number of items are present in a family of interest.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
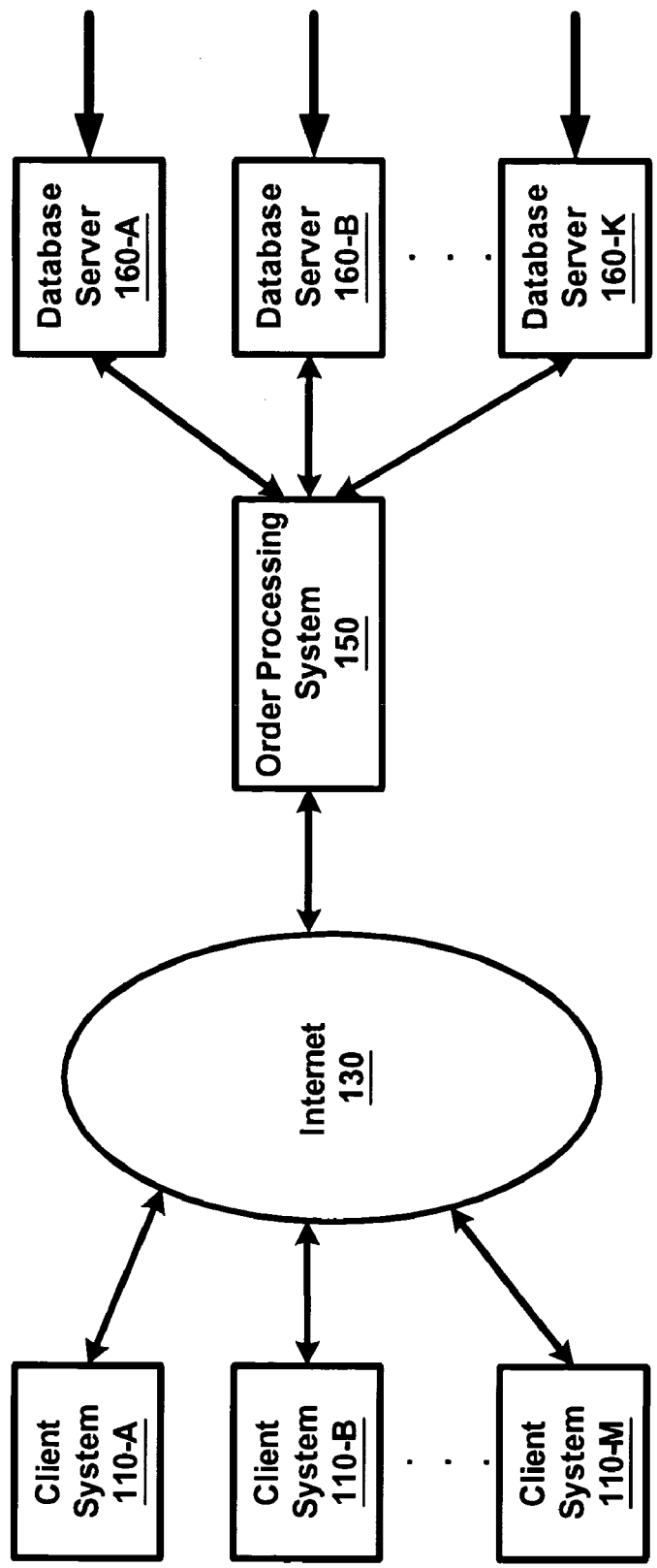
FIG. 1 is a block diagram illustrating an example environment in which the present invention can be implemented.

FIG. 1 is a block diagram illustrating the details of an example environment in which the present invention can be implemented. The block diagram is shown containing client systems 110-A through 110-M, internet 130, order processing system 150, and database servers 160-A through 160-K. Each block is described below in detail.

It should be understood that only representative example components are shown in the diagram so as not to obscure various features of the present invention. However, it will be apparent to one skilled in the relevant arts that environments may contains several other (both in number and type) components, without departing from the scope and spirit of various aspects of the present invention.

Internet 130 provides connectivity between client systems 110-A through 110-M and order processing system 150. Internet 150 may contain several devices (e.g., bridges, routers, modems, communication links, etc.,) operating according to protocols such as TCP/IP well known in the relevant arts. However, other forms (e.g., point-to-point private network using proprietary protocols or ATM-based network) can also be used to provide connectivity between the client systems and the order processing system.

Client systems 110-A through 110-M enable users to place an order for a desired quantity of a member item of a family by a desired date, and to receive response indicating whether a provider (e.g., a company manufacturing the member item) promises to fulfill the order by the desired date. Client systems may be implemented using computer systems available from businesses such as Dell, Compaq, Sun Microsystems, etc.

Database servers 160-A through 160-K provide a repository for storing various pieces of information (or data) such as the member items in each family, the scheduled supply of member items for each day, orders promised, etc. Some of the pieces of information may be generated from other systems, and stored in database servers 160-A through 160-K. Database servers can integrated with order processing system 150 as a single unit.

In addition, database servers 160-A through 160-K may store various pieces of information generated by order processing system 150 while promising orders received from client systems 110-A through 110-M. In general, the database servers allow data to be stored and retrieved using structured queries, and may be implemented in a known way using one of several commercially available database products from companies such as Oracle, IBM, Microsoft, etc.

Order processing system 150 may implement a supply chain management (SCM) system which determines whether an order for a desired quantity for a member of a product family for a desired date can be promised or not. In general, order processing system 150 receives an order from one of the client systems from Internet 130, and generates a response indicating whether the order can be promised or not.

The manner in which order processing system 150 may generate a response according to various aspects of the present invention is described below in further detail with several examples. First, the manner in which an embodiment of order processing system 150 is implemented substantially in the form of a software-driven digital processing system is described in below.

3. Software-Driven Implementation

Figure 2:
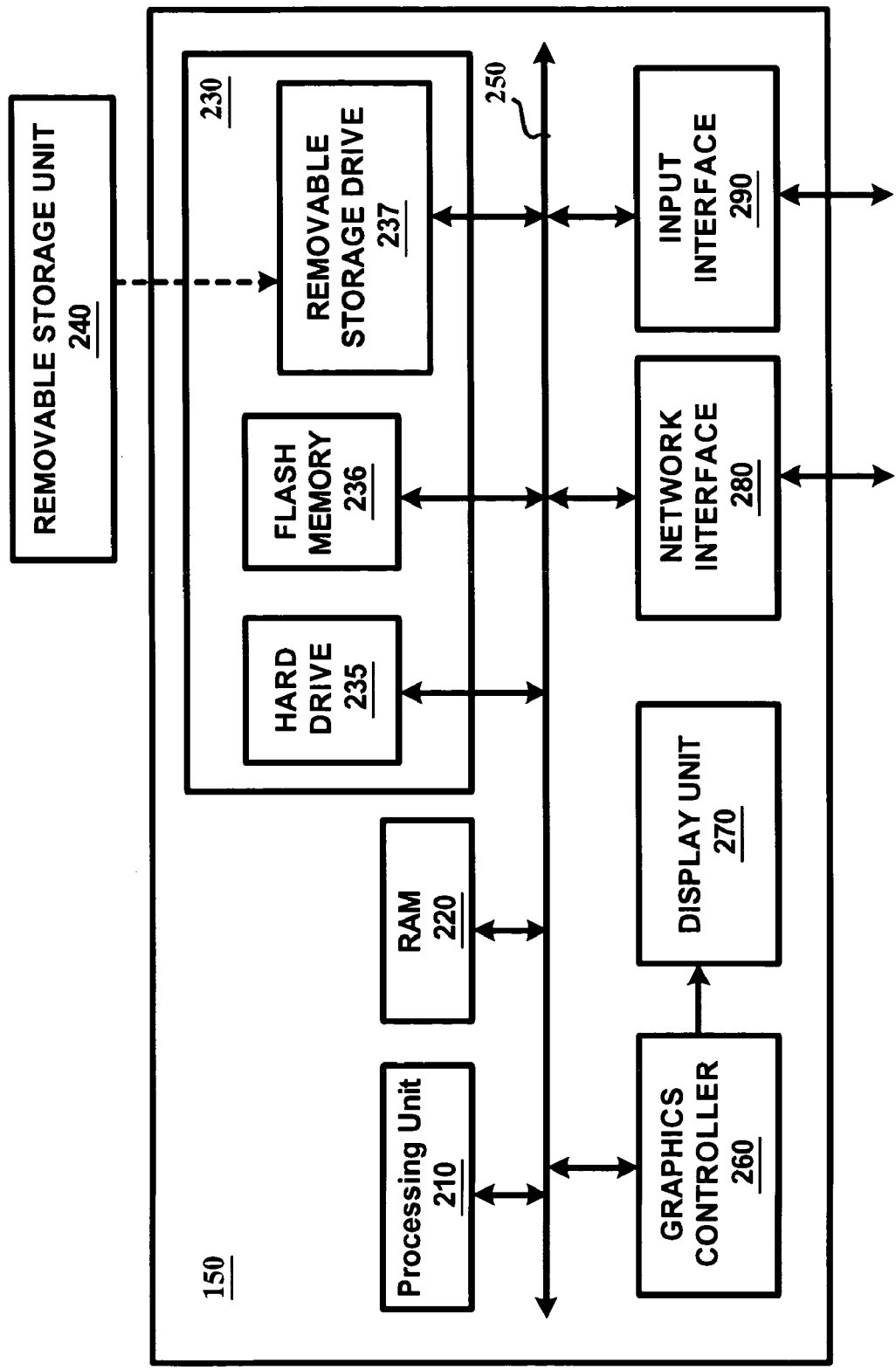
FIG. 2 is a block diagram illustrating an embodiment of an order processing block implemented substantially in the form of a software controlled digital processing system according to an aspect of the present invention.

FIG. 2 is a block diagram illustrating the details of order processing system 150 implemented substantially in the form of software in an embodiment of the present invention. Order processing system 150 may contain one or more processors such as processing unit 210, random access memory (RAM) 220, secondary memory 230, graphics controller 260, display unit 270, network interface 280, and input interface 290. All the components except display unit 270 may communicate with each other over communication path 250, which may contain several buses as is well known in the relevant arts. The components of FIG. 2 are described below in further detail.

Processing unit 210 may execute instructions stored in RAM 220 to provide several features of the present invention. Processing unit 210 may contain multiple processors, with each processor potentially being designed for a specific task. Alternatively, processing unit 210 may contain only a single processor. RAM 220 may receive instructions and data from secondary memory 230 and network interface 280 using communication path 250.

Graphics controller 260 generates display signals (e.g., in RGB format) to display unit 270 based on data/instructions received from Processing unit 210. Display unit 270 contains a display screen to display the images defined by the display signals. Input interface 290 may correspond to a key-board and/or mouse, and generally enables a user to provide various inputs (e.g., ATF duration). Network interface 280 enables some of the inputs (and outputs) to be provided on a network and also to interface with database servers 160-A through 160-K. Display unit 270, input interface 290 and network interface 280 may be implemented in a known way.

Secondary memory 230 may contain hard drive 235, flash memory 236 and removable storage drive 237. Secondary memory 230 may store the data (e.g., ATF duration, member items in a family, supply of each member item in each day, etc.) and software instructions which cause order processing system 150 to provide several features in accordance with the present invention. Some or all of the data and instructions may be provided on removable storage unit 240, and the data and instructions may be read and provided by removable storage drive 237 to processing unit 210. Floppy drive, magnetic tape drive, CD-ROM drive, DVD Drive, Flash memory, removable memory chip (PCMCIA Card, EPROM) are examples of such removable storage drive 237.

Removable storage unit 240 may be implemented using medium and storage format compatible with removable storage drive 237 such that removable storage drive 237 can read the data and instructions. Thus, removable storage unit 240 includes a computer readable storage medium having stored therein computer software and/or data. An embodiment of the present invention is implemented using software running (that is, executing) in order processing system 150.

In this document, the term "computer program product" is used to generally refer to removable storage unit 240 or hard disk installed in hard drive 235. These computer program products are means for providing software to order processing system 150. Processing unit 210 may retrieve the software instructions, and execute the instructions to provide various features of the present invention as described below in detail. The description is continued with respect to examples illustrating a manner in which several aspects of the present invention may be implemented.

Figure 3:
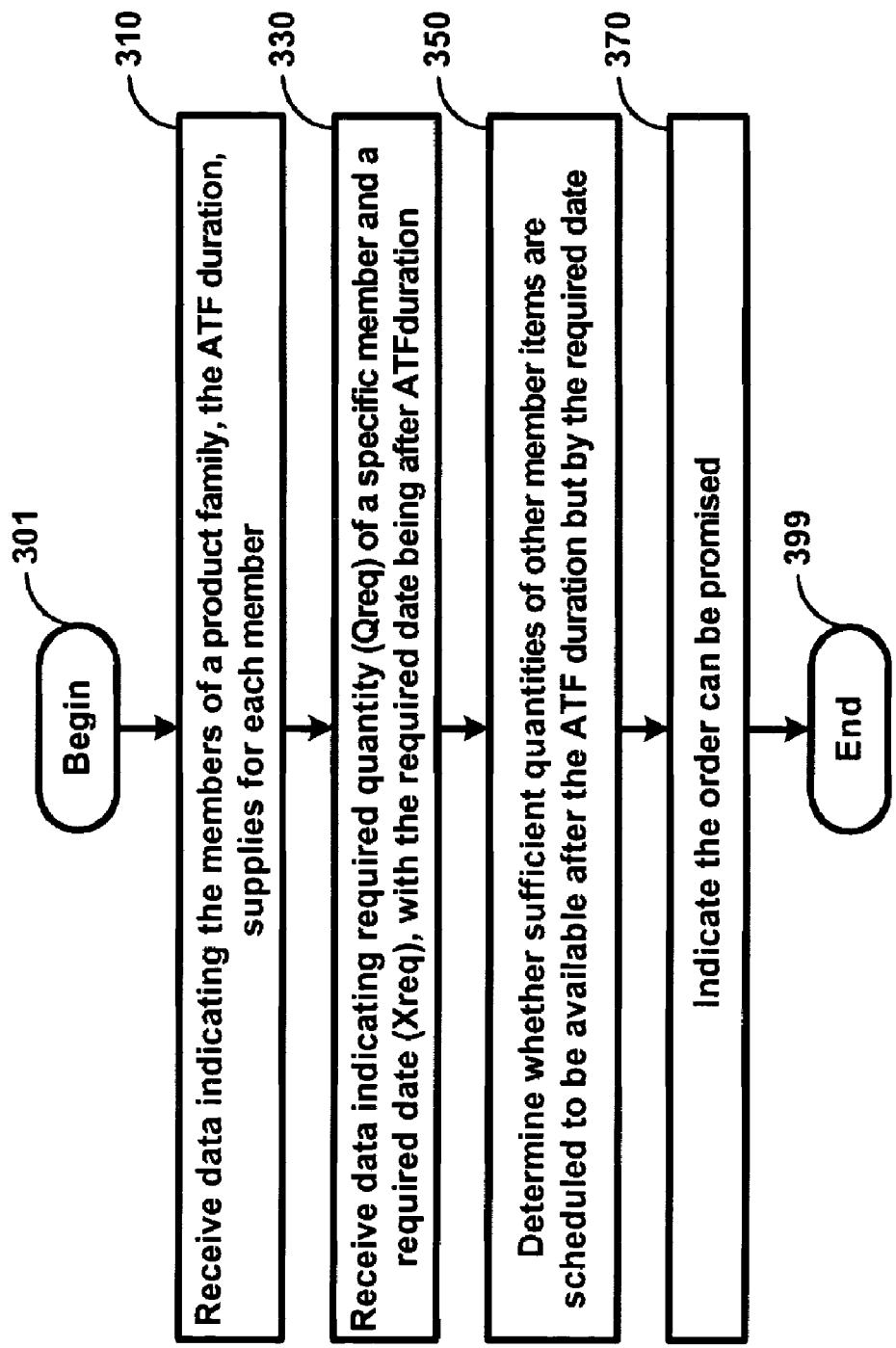
FIG. 3 is a flow-chart illustrating the manner in which an order with a required quantity (of a member item of a family of products) exceeding scheduled availability of the member item can be promised if the required date is after the aggregate time fence (ATF) point according to an aspect of present invention.

4. Promising an Order when the Expected Quantity Availability of a Member Item is Less than Desired Quantity FIG. 3 is a flow-chart illustrating the manner in which an order for a member item can be promised according to an aspect of present invention even if quantity expected to be available is less than the desired quantity indicated by an order. The flow-chart is described with reference to FIGS. 1 and 2 for illustration. However, the method may be implemented in other environments as well. The method begins in step 301 in which control immediately passes to step 310.

In step 310, order processing system 150 receives data indicating the members of a product family, the ATF duration, and the quantity of supply on each day for each member item. Merely for simplicity, it is assumed that the ATF duration with respect to any pair of member items is equal. However, the ATF duration can be different for different ordered pairs of member items, which could be the case if the degree of similarity (in resource usage) is different for different ordered pairs. The implementation of order processing system 150 with such different ATF durations will be apparent to one skilled in the relevant arts by reading the disclosure provided herein.

In step 330, order processing system 150 receives an order indicating required quantity (Qreq) of a specific member item and a required date (Xreq), with the required date being after ATF duration from the present time. Such a data may be sent by a user using one of client systems before promising a customer that the required quantity can be supplied on a required date. Alternatively, the customer may be provided the ability to send the order directly to order processing system 150.

In step 350, order processing system 150 determines whether sufficient quantities of other member items (of the family) are scheduled to be available after the ATF duration but by the requested date (Xreq). Order processing system 150 generates a signal indicating that the order can be promised if such sufficient quantities are determined to be available. Assuming that QIx represents the quantity of the specific member items expected to be available as of the required date, at least (Qreq−QIx) items need to available after the ATF duration from other member items, but by the requested date (Xreq).

The method ends in step 399. While the approach of FIG. 3 pertains to orders with required date which is after the ATF duration and with the required quantity being more than the quantity available as of the requested date, such approach needs to operate integral to general order processing. Some features of such a general order processing approach in one embodiment are described below in further detail. First, the terminology employed in such an embodiment is briefly noted.

5. Terminology

The terminology (which in turn illustrates the computations) employed in an embodiment is briefly described below. The manner in which each item of the terminology can be determined (or computed) is described in appropriate portions of the below sections with reference to FIGS. 5 through 10.

TF (Time Fence) Duration: As noted above, represents an amount of advance time duration after which the supply of one member item is available to satisfy the demand for another member item.

ATF Duration: Assuming the TF duration is equal for all pairs of member items, the TF duration is referred to as ATF duration since the aggregate supply of all member items is available to satisfy the demand for any member item after the ATF duration.

ATF Point: ATF duration counted from the present day (the date in which an order is received). In the illustrative examples described below, the ATF point is shown between the $5^{th}$ and $6^{th}$ days corresponding to ATF duration of 5 days.

Item supply: It is the total number units of an item that are scheduled to be available on the corresponding day. In the illustrative example, item supply corresponding to each of the items A and B is assumed to be 10 units per day, as depicted in rows 580 and 590 (before the ATF duration) in FIG. 5.

Item demand: It is the total number of units of an item that are required to be delivered on a specified day in view of the committed orders, irrespective of whether sufficient supply is available or not. Item demand is updated in response to each order as described in sections below with examples.

Item Bucketed Allocation: The sum of the allocations on the given day in response to the demand for the specific item within or after the ATF duration. Item bucketed allocation represents the number of units allocated from the present item available units for the specific item within ATF. 'Item bucketed allocation' is applicable only in the ATF duration.

Net item available: Item supply less item bucketed allocation on that day.

Backward consumption: Backward consumption for a given day equals the number of units (quantity) of the item consumed from prior days to satisfy shortage of supply on the given day less the number of units made available to satisfy shortage of supply in future days.

Forward consumption: Forward consumption for a given day equals the number of units (quantity) of the item consumed from future days to satisfy shortage of supply on the given day less the number of units made available to satisfy shortage of supply in prior days.

Present item availability: Represents the number of units (quantity) of the item available for future orders in view of all the committed orders, and equals the net item available plus (forward consumption+backward consumption). Present item availability is applicable only before ATF point.

Cumulative item availability: For a given day before ATF point, equals aggregate of present item availability up to the given day. For a given day after ATF point, the cumulative item availability of the item at ATF point plus sum of present item availability of all the items in the family after ATF point up to the given day.

Family supply: Aggregate of item supplies in the product family in the corresponding day. For example, in FIG. 5, the family supply is equal to 20 on each day (10 units from member-A and 10 units from member-B).

Family bucketed allocation: Represents the number of units allocated for the specific date from the pool of units generated from all items of the family. Family bucketed allocation is applicable after ATF.

Net family available: Family supply less family bucketed allocation on that day.

Present Family availability: Represents the number of units of the entire family available for future orders in view of all the committed orders, and equals net family availability plus (forward consumption+backward consumption). Present Family availability is applicable only after ATF period.

The manner in which orders can be promised using the conceptual basis underlying such terminology is described below with several examples below.

6. Processing Orders

Figure 4A:
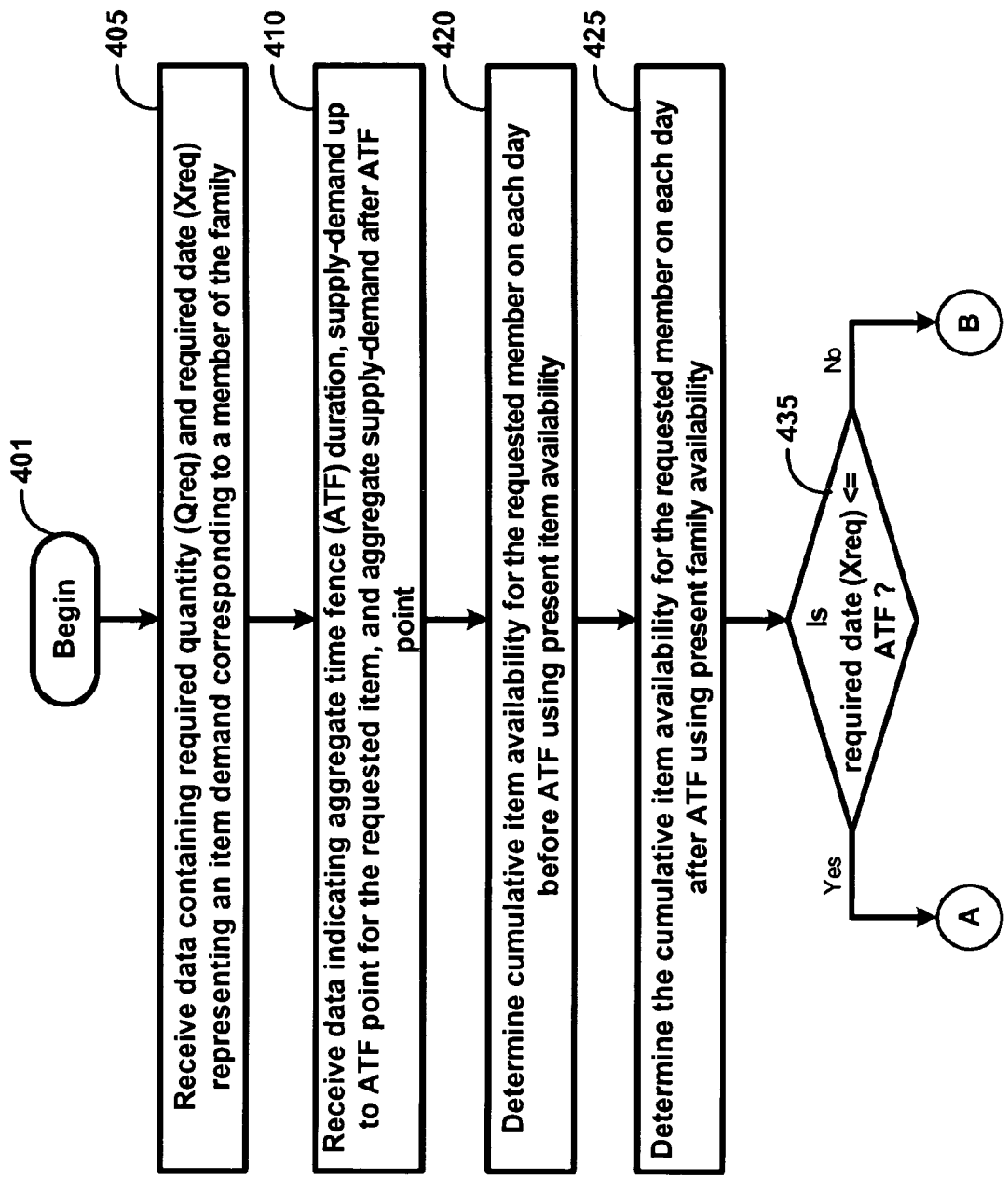
FIGS. 4A, 4B and 4C are portions of a flow-chart which together illustrate the manner in which orders related to a family of products can be processed in an embodiment of the present invention.
Figure 4B:
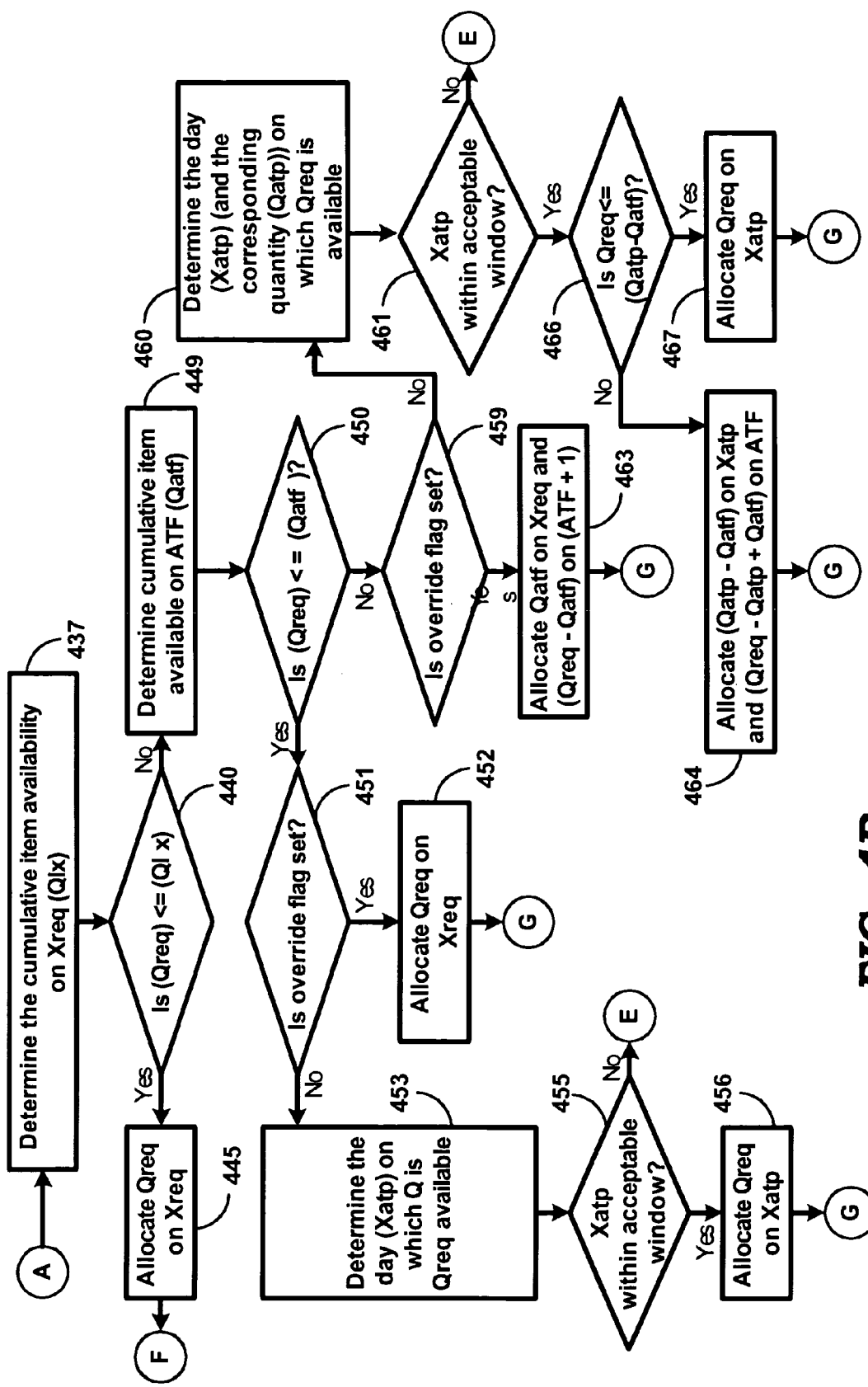
Figure 4C:
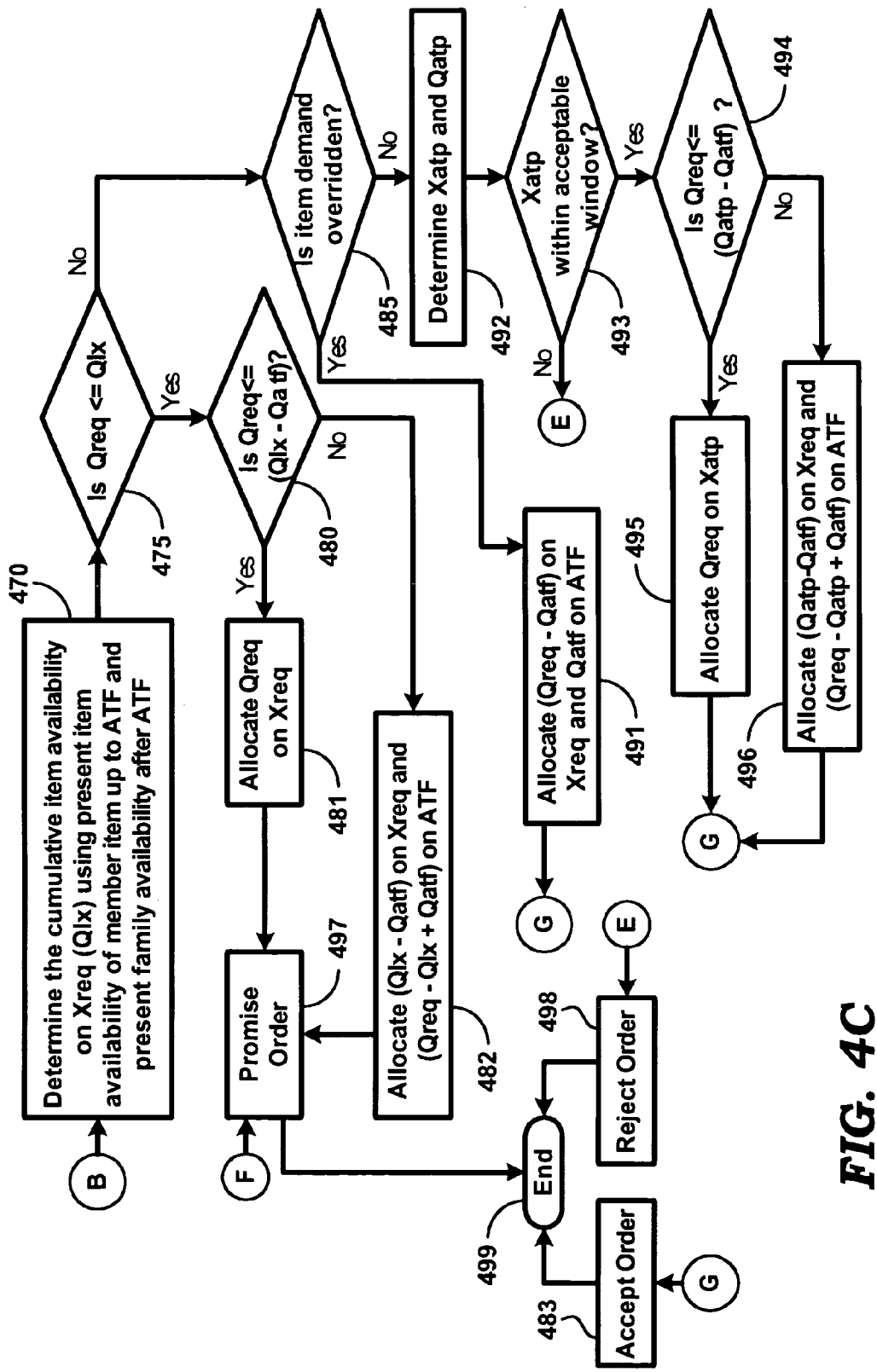

FIGS. 4A, 4B and 4C are portions of a flow-chart which together illustrate a manner in which each order related to a family of products can be processed in an embodiment of the present invention. The flow-chart is split into separate FIGS. 4A, 4B and 4C merely for clarity. The method begins in step 401 in which the control immediately passes to step 410.

With reference to FIG. 4A, in step 405, order processing system 150 receives an order containing required quantity (Qreq) and required date (Xreq) representing an item demand corresponding to a member ("ordered item") of the product family. The item demand for a member of the product family may be provided by an user (e.g., a sales person/customer) to determine the availability of units corresponding to a member item.

In step 410, order processing system 150 receives data indicating aggregate time fence (ATF) duration, supply-demand up to ATF point for the requested item, and aggregate supply-demand after ATF point.

In step 420, order processing system 150 determines cumulative item availability for the requested member on each day before ATF point using present item availability. In step 425, order processing system 150 determines the cumulative item availability for the requested member on each day after ATF using present family availability. An availability diagram is built using supplies, present availabilities, cumulative availabilities etc.

In step 435, order processing system 150 compares the ATF point with the required date to determine whether Xreq is within the ATF duration (from the present date). Control is transferred to step 437 (of FIG. 4B) if the condition is true, otherwise to step 470 (of FIG. 4C). Thus, control is transferred to FIG. 4B if the required date (Xreq) is within the ATF duration and to FIG. 4C otherwise.

With reference to FIG. 4B, in step 437, order processing system 150 determines the cumulative item availability of the ordered item on Xreq (QIx) using the computations performed in step 420. In step 440, order processing system 150 determines whether the required quantity (Qreq) is less than or equal to cumulative item availability (QIx) on Xreq. Control is transferred to step 445 if the condition is true, otherwise to step 449.

In step 445, order processing system 150 allocates Qreq (required quantity) on Xreq (required date). As may be appreciated, the allocation is based on availability of the requested quantity (Qreq) of the ordered item only, since the requested date (Xreq) is within the ATF duration. Control is then transferred to step 497 via connector F.

In step 449, cumulative item availability (Qatf) at ATF point for the requested item is determined. In step 450, order processing system 150 determines whether the required quantity (Qreq) is less than or equal to cumulative item available on ATF (Qatf). Control passes to step 451 if the condition is true, otherwise to step 459.

In step 451, order processing system 150 determines whether an override flag is set associated with the order. The override flag associated with an order indicates that attempt should be made to process the order as of the requested date. If the flag is not set, the day (Xatp) on which Qreq is available is determined.

In general, the fulfillment of the order is delayed till Xatp if override flag is not set associated with an order, compared to scenarios if the flag is set. Example approaches on how to process an order in the case of different values for the override flag, are described below. Control passes to step 452, if the condition (override flag being set associated with the order) is true, otherwise to step 453.

In step 452, Qreq is allocated on Xreq and the control is transferred to step 483 via connector G. As described below with reference to FIG. 4C, the order is being accepted with potentially the requested date (Xreq) not being met (unless some of the orders become unscheduled later).

In step 453, order processing system 150 determines the day (Xatp) on which Qreq is available. In step 455, order processing system 150 determines whether Xatp is within an acceptable window from the requested date Xreq. In an embodiment, while placing an order, the user is provided the option of specifying a number of days from Xreq, which would be acceptable to the user. Thus, control passes to step 456 if Xatp is within such an acceptable window, and otherwise to step 498 via connector E. In step 456, order processing system 150 allocates Qreq on Xatp.

In step 459, order processing system 150 determines whether a override flag is set associated with the order. The override flag associated with an order indicates that attempt should be made to process the order by allocating from family availability to meet the shortage in fulfilling Qreq. Control passes to step 463 if the condition is true (override flag set), otherwise to step 460.

Step 460 is reached if sufficient quantity is not available as of both the ATF point (as in step 450) and requested date (step 440), and override flag is not set (step 459). In step 460, order processing system 150 determines the day (Xatp) (available to promise) on which Qreq of the ordered item is available, and the corresponding cumulative item availability (Qatp) on that day.

In step 461, order processing system 150 determines whether Xatp is within an acceptable window from the requested date Xreq. In an embodiment, while placing an order, the user is provided the option of specifying a number of days from Xreq, which would be acceptable to the user. Thus, control passes to step 466 if Xatp is within such an acceptable window, and otherwise to step 498 via connector E.

In step 466, order processing system 150 determines whether the Qreq of the ordered item is available based on surplus cumulative item availability between the ATP point (Xatp) and the ATF point by comparing Qreq with (Qatp−Qatf). Control passes to step 467 if Qreq is less than (Qatp−Qatf), otherwise to step 464.

In step 464, order processing system 150 allocates (Qatp−Qatf) on Xatp and the remaining quantity (Qreq−Qatp+Qatf) on the last day of ATF duration and control passes to step 483 via connector G. In step 467, order processing system 150 allocates Qreq on Xatp and control passes to step 483 via connector G.

Now continuing the description with reference to FIG. 4C, it is first noted that connector B passes control to step 470 in case the required date (Xreq) is after the ATF point In step 470, order processing system 150 determines the cumulative item availability (QIx) on the requested date (Xreq) using present item availability of a member item up to ATF and present family availability after ATF. As noted above, the cumulative item availability of the ordered item on a day after the ATF point equals the cumulative item availability of the item at ATF point plus sum of present item availability of all the items in the family after ATF point up to Xreq.

In step 475, order processing system 150 determines whether Qreq is less than or equal to QIx. Control is transferred to step 480 if such a condition is true, otherwise to step 485. In step 480, a determination is made as to whether Qreq is less than or equal to (QIx−Qatf). Control is transferred to step 481 if such a condition is true, otherwise control is transferred to step 482.

In step 481, order processing system 150 allocates Qreq on Xreq. In other words, the quantity is allocated from the units available from the entire family after the ATF time point. By such an allocation, the units available in the ATF duration can potentially be used to promise orders with required dates within ATF duration. Control is then transferred to step 497.

In step 482, order processing system 150 allocates (QIx−Qatf) on Xreq and the remaining required quantity (Qreq−QIx+Qatf) on the last day of the ATF duration. Again, as in step 481, as many units as possible are allocated first from the aggregate number of units available from the entire family, and only the remaining units are allocated from the available quantities of the specific ordered item. Control is then transferred to step 497.

In step 485, order processing system 150 determines whether the item demand is overridden. Control is transferred to step 491 if the condition is true, otherwise to step 492. In step 491, order processing system 150 allocates (Qreq−Qatf) on Xreq, and Qatf on ATF, maintaining the allocation dates close to required date (Xreq) as described above. Control is then transferred to step 483 via connector G. In step 492, order processing system 150 determines ATP date (Xatp) and the corresponding cumulative item availability (i.e., Qatp), as described above with reference to step 460.

In step 493, order processing system 150 determines whether Xatp is within an acceptable window from the requested date Xreq. In an embodiment, while placing an order, the user is provided the option of specifying a number of days from Xreq, which would be acceptable to the user. Thus, control passes to step 494 if Xatp is within such an acceptable window, and otherwise to step 498 via connector E.

In step 494, order processing system 150 determines whether Qreq is less than or equal to (Qatp−Qatf). Control is transferred to step 495 if the condition is true, otherwise to step 496. In step 495, order processing system 150 allocates quantity Qreq on ATP date Xatp, and the control is transferred to step 483 via connector G. In step 496, order processing system 150 allocates a quantity of (Qatp−Qatf) on Xreq, and (Qreq−Qatp+Qatf) on Xatf and control is then transferred to step 483 via connector G.

In step 483, order processing system 150 enables the order to be accepted, possibly by indicating (corresponding Xatp date) that the order is likely to be delayed. In step 497, order processing system 150 indicates that the order can be promised (or promises the order). In step 498, order processing system 150 rejects (i.e., no promise, no accept) the order. The method ends in step 499.

Thus, the approaches of above can be used to process orders according to various aspects of the present invention. In general, order processing system 150 needs to perform several computations and keep track of several variables while processing the orders. Some examples are provided below with reference to FIGS. 5-10 illustrating such computations and variable values as successive orders are processed in an example embodiment. The start state in such an embodiment is described first with reference to FIG. 5.

7. Start State

FIG. 5 contains a table illustrating a start state assuming that no prior orders are received merely for illustration. Table 500 contains numbers assuming that there are only two member items (item-A and item-B), each with a corresponding daily item-supply of 10 units, and with a ATF duration of 5 days. Table 500 (as are tables of other FIGS. 6A, 6B, 7-11, but with different row numbers) is shown containing rows family supply 570, family bucketed allocation 571, net family available 572, backward consumption 573, net+backward consumption 574, forward consumption 575, and present family availability 578 for the entire family of products.

Table 500 further contains item supply-A 580, item demand 581, item bucketed allocation 582, net item-a available 583, backward consumption 584, net+backward consumption 585, forward consumption 586, present item-A availability 588, and cumulative item-A available 589 for item-A. Similar rows 590-596 and 598-599 are shown for item-B. Only various rows of interest are described with reference to each table below merely for conciseness.

As ATF duration is indicated to be 5 days, the ATF point is shown between days 5 and day 6 with a dark line. The entries corresponding to bucketed allocations (rows 582, 592 and 571), backward consumption (rows 573, 584, and 594), forward consumption (rows 575, 586, 596), item demands (rows 581 and 591) are shown with 0 value as no orders have been processed yet.

Family supply 570 is shown containing 20 units for each day, representing 10 units of supply for each member item shown in rows 580 and 590. Present item availability (rows 588 and 598) is shown as 10 units in each day.

Cumulative item availability (589 and 599) is shown with increments of 10 (i.e., 10, 20, 30, 40 and 50 in the five days respectively) in successive entries before ATF date. However, after ATF date, the cumulative item availability (589 and 599) is shown with values of 70, 90 and 110 respectively representing the cumulative item availability at the ATF point plus the present family availability 578 in each entry.

The manner in which successive orders can then be processed is described below with additional examples.

8. Processing Orders when the Required Date is within ATF Duration and the Required Quantity of the Ordered Item is Scheduled to be Available For illustration, it is assumed that an order for 30 units of item-A with a required date of day 3 is received when the status is represented by FIG. 5. The manner in which the order is processed is described with combined reference to FIGS. 1, 4A, 4B, 4C and 5 for illustration.

As may be readily appreciated, order processing system 150 determines that the required date (Xreq) is within the ATF duration (since Xreq is less than Xatf) in step 435. Control accordingly passes to step 437, in which order processing system 150 examines cumulative item availability 589 on day 3 (having a value of 30) to determine that sufficient quantity of the ordered item is scheduled to be available to promise the order. Accordingly, order processing system 150 may promise the order.

It may be appreciated that the order of above is promised based on a single look-up of the relevant table/data, and without requiring substantial computation once the order is received. Accordingly, order processing system 150 may be able to generate a quick response when an order is received even if there are many order items within a family. To continue to provide such quick responses, various entries of table 500 may need to be modified after promising the above-noted order. Such modifications are illustrated with reference to FIG. 6A.

FIG. 6A is shown containing table 600 representing the values of various entries once the above noted order (Qreq=30 units, and Xreq=day 3) is processed in relation to table 500 of FIG. 5. Only the differences of table 600 from table 500, and required computations are described briefly in detail.

The item demand and item bucketed allocation rows on day (Xreq=day 3) are incremented by (Qreq=30), and the resulting value 30 is shown in rows 631 and 632. The net item-A available (of row 633) on each day up to day 3 is equal to item-A supply less item-A bucketed demand allocation corresponding to each day (up to day 3) and is equal to 10, 10, and −20. The negative sign associated with 20 (on day 3) indicates the shortage of 20 units on day 3 to fulfil Qreq (as 10 units are already available on day 3).

The backward consumption (of row 634) value corresponding to day 1 equals −10 (0−10), as 0 units are consumed from previous days (prior to day 1) and 10 units (equal to net item availability of day 1) is made available to satisfy Qreq=30 on day 3. Similarly, backward consumption value for days 2, and 3 are respectively equal to −10 (0−10), and +20 (20−0). The negative sign associated with 10 on day 1 and 2 indicates that the net item-A available on day 1 and day 2 is consumed to meet required quantity (Qreq=30) on day 3. A value of +20 on day 3 indicates that a total of 20 units is consumed from previous days net item availability.

Net+backward consumption (in row 635) is computed by adding the values of net item-A available and backward consumption corresponding to each day and is equal to 0 on each day up to (Xreq=3). As aggregate of net item-A available on each day up to day 3 is sufficient to promise the ordered item, forward consumption (in row 636) for each day is equal to 0. Backward consumption and forward consumption corresponding to each day is shown merely for understanding. However, the values of net item-A availability, Net+backward consumption may be stored for further use.

Present item-A availability (of row 638) is determined by adding the values of Net+backward consumption and forward consumption corresponding to each day and is equal to 0 up to (Xreq=day 3). The cumulative item-A availability (of row 639) on each day is determined by adding the cumulative item-A availability of previous day with the present item-A availability on that day and is equal to 0 up to day 3. The cumulative item-A availability on day 4 equals 10 (i.e., 0+10), and on day 5 equals 20 (10+10). The cumulative item availability on day 6 equals 40 (20 units available on day 5 plus 20 units of present family availability on day 6), and that of 7, and 8 equals 60 and 80.

Once computations such as above are performed and the appropriate values for the entries are determined, the next order may be received and processed quickly. For illustration, it is assumed that an order for 20 units of item-B with a required date (Xreq=day 2) is received when the status is represented by FIG. 6A.

As may be readily appreciated, order processing system 150 determines that the required date (Xreq) is within the ATF duration in step 435. Control accordingly passes to step 437, in which order processing system 150 examines cumulative item-B availability 649 on day 2 (equal to 20) to determine that sufficient quantity of ordered item is available to promise the order.

Accordingly, order processing system 150 may promise the order quickly as only values corresponding to item-B needs to be examined, various entries of table 600 may need to be modified after promising the above-noted order. The status after modification is reflected by the contents of table 650 FIG. 6B. Only the differences of table 650 from table 600, and the required computations are described briefly in detail.

The item demand and item bucketed allocation rows on day (Xreq=day 2) are incremented by (Qreq=20), and the resulting value 20 is shown in rows 691 and 692 of day 2. The net item-B available (of row 693) on day 1 and 2 is equal to 10, and −10. The negative sign associated with 10 (on day 2) indicates a shortage of 10 units on day 2 to fulfill Qreq (as only 10 units are available on day 2). Net item-B available on each day is computed similar to computation of net item-A available as described above.

The backward consumption (of row 694) value corresponding to day 1 equals −10 (0−10), as 0 units are consumed from previous days (to satisfy shortage on day 1) and 10 units (equal to net item availability of day 1) is made available to satisfy Qreq=20 on day 2. Similarly, backward consumption value for day 2 is equal to +10 (10−0). The negative sign associated with 10 on day 1 indicates that the net item-B available on day 1 is consumed (by demand on day 2) to meet required quantity (Qreq=20) on day 2. A value of +10 on day 2 indicates that a total of 10 units is consumed from previous days supplies.

Net+backward consumption (in row 695) is computed by adding the values of net item-B available and backward consumption corresponding to each day and is equal to 0 on day 1 and 2 (i.e., up to Xreq=2). As aggregate of net item-B available on day 1 and 2 is sufficient to promise the ordered item, forward consumption (in row 696) for day 1 and 2 equals 0. The values of net item-B availability, Net+backward consumption may be stored for further use.

Present item-B availability (of row 698) is determined by adding the values of Net+backward consumption and forward consumption corresponding to each day and is equal to 0 on day 1 and 2. The cumulative item-B availability (of row 699) on day 1 and 2 is determined by adding the cumulative item-B availability of previous day with the present item-B availability on that day and is equal to 0 up to day 2. The cumulative item-B availability from day 3 to day 5 is respectively equal to 10, 20, and 30 and that of day 6, 7 and 8 (after ATF point) equals 50, 70, and 90 respectively. The cumulative item-B availability is computed similar to that of cumulative item-A availability as described above.

The description is continued with reference to processing an order when the required date is after ATF duration and required quantity (Qreq) of item-A is available, but using the units scheduled to be produced for other members of the family after ATF point.

9. Processing Orders when the Required Date is after ATF Duration and the Required Quantity is Scheduled to be Available For illustration, it is assumed that an order for 50 units of item-A with a required date (Xreq=day 7) is received when the status is represented by FIG. 6B. Order processing system 150 determines that the required date (Xreq) is after the ATF duration in step 435. Control accordingly passes to step 470, in which order processing system 150 examines cumulative item-A availability 689 on day 7 (equal to 60) to determine that sufficient quantity of ordered item is available to promise the order.

Accordingly, order processing system 150 may promise the order quickly as only values corresponding to item-A and family needs to be examined (as values in the family are pre-computed to represent the supplies available after allocation of order items belonging to a member of the family). Various entries of table 650 may need to be modified after promising the above-noted order. Table 700 of FIG. 7 reflects the status after the modifications are performed.

Figure 7:
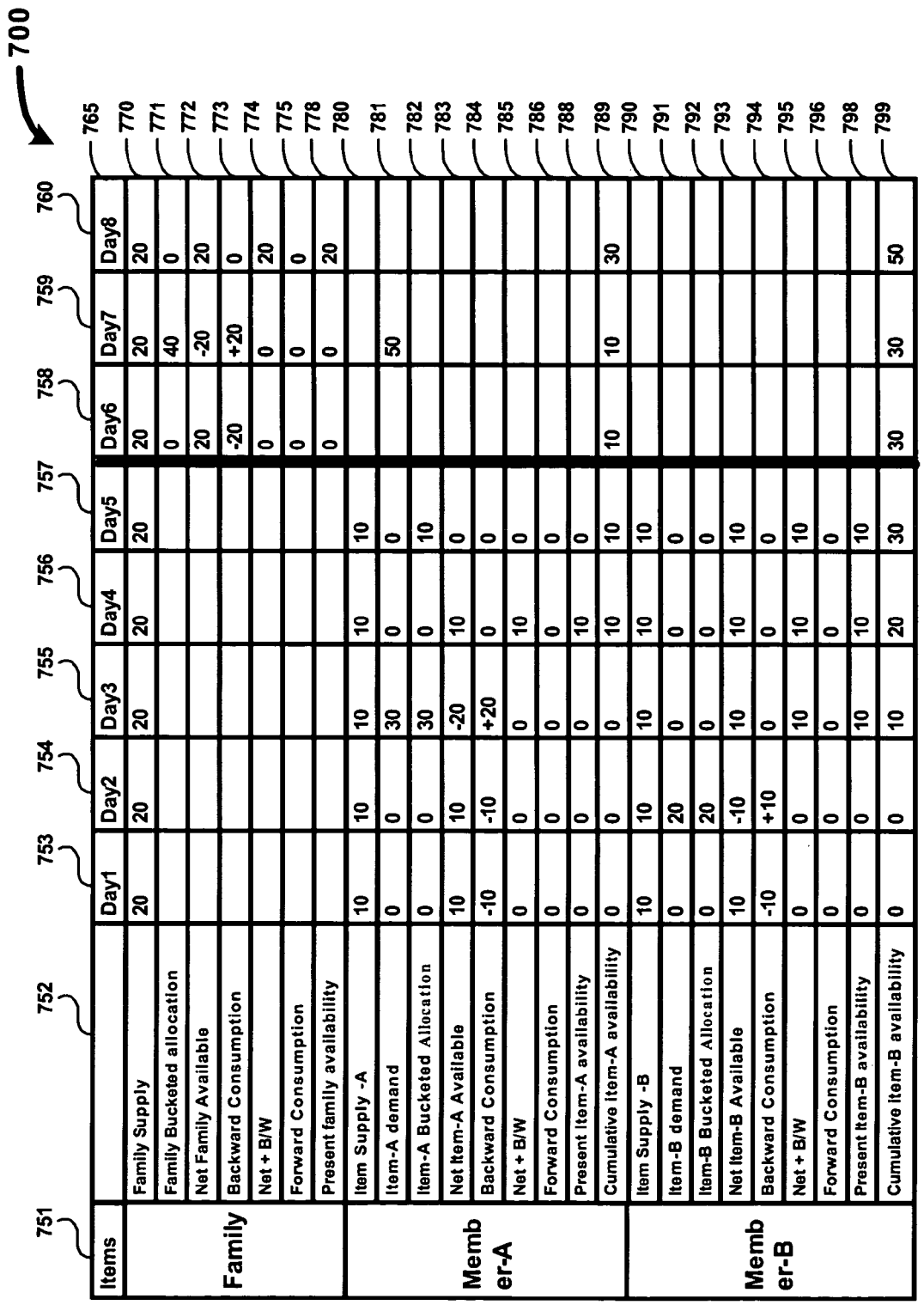
FIG. 7 is shown containing a table illustrating the status of different variables after a third order for a first member item is accepted, with the third order having a required date after the ATF point, and with the required quantity not being scheduled to be available on the required date.

FIG. 7 is shown containing table 700 representing the values of various entries once the above noted order (Qreq=50 units, and Xreq=day 7) is processed in relation to table 650 of FIG. 6B. Only the differences of table 700 from table 650, and required computations are described briefly in detail.

The item demand (of row 781) on day 7 is incremented by 50, family bucketed allocation (of row 771) on day (Xreq=day 7) is incremented by 40, and item bucketed allocation (of row 782) is incremented by 10 on day 5. It may be appreciated that allocations are performed from only two buckets (one from the supply available for the corresponding member item and the other from the supply available for the entire family) irrespective of the number of items available from the family. As a result, the order can be promised quickly even in complex environments. The modifications corresponding to family are described first, then the modifications corresponding to member item-A are described.

The net family available (of row 772) on days 6 and 7 is respectively equal to 20 and −20. The net family available on day 6 is equal to family supply (equal to 20) less family bucketed allocation (equal to 0) corresponding to day 6. Similarly, on day 7 net family available is equal to −20 (i.e., family supply of 20 less the family bucketed allocation equal to 40).

Backward consumption (of row 773) for day 6 equals −20 (as the quantity consumed to satisfy the demand on day 6 from previous days supplies (equal to 0) less the quantity made available (equal to 20 from supplies available on day 6) to satisfy required quantity on day 7). Similarly, backward consumption value on day 7 may be computed and is equal to +20. Net+backward consumption (of row 774) on day 6 and 7 is equal to 0 (adding corresponding values of row 772 and 773).

Present family availability (of row 778) corresponding to days 6 and 7 respectively equals 0 (as the sum of corresponding values in row 774 and 775 equals 0). It may be appreciated that a quantity as much as possible is allocated from family pool (after ATF point) and the remaining quantity is allocated on a day (within ATF duration) close to the required day (Xreq) (as described above with reference to step 482).

Item-A bucketed allocation (of row 782) at ATF point (on day 5) equals 10. The net item-A available (of row 783) is equal to 0 (corresponding value of row 780 (equal to 10) less the value in row 782 (equal to 10)). Net+backward consumption (of row 785) is equal to 0 (sum of corresponding values in row 783 and 784). Present item-A availability (of row 788) is equal to 0 (sum of corresponding values in row 785 and 786). The cumulative item-A availability on day 5 equals 10 (within ATF duration) and on day 6, 7 and 8 is respectively equal to 10, 10 and 30. The cumulative item availability may be computed as described above with reference to row 689 of FIG. 6B.

The description is continued with reference to processing an order when the required date (Xreq) is after ATF duration and required quantity (Qreq) of item-A is not scheduled to be available.

10. Processing Orders when the Required Date is after ATF Duration and the Required Quantity is not Scheduled to be Available For illustration, it is assumed that an order for 65 units of item-B with a required date (Xreq=day 8) is received when the status is represented by FIG. 7. Order processing system 150 determines that the required date (Xreq) is after the ATF duration in step 435. Control accordingly passes to step 470, in which order processing system 150 examines cumulative item-B availability 799 on day 8 (equal to 50) to determine that sufficient quantity of ordered item is not scheduled to be available. Control then passes to step 485.

In step 485, order processing system 150 determines whether item demand is overridden with respect to item-B. If it is not overridden, control passes to step 492. For illustration, it is assumed that the item demand is overridden for item-B. Accordingly, control passes to step 491.

Various allocations are performed as noted in step 491, and the order is indicated to be accepted. Various entries of table 700 may need to be modified after accepting the above-noted order. The modifications of table 800 from table 700 are briefly noted below.

FIG. 8 is shown containing table 800 representing the values of various entries once the above noted order (Qreq=65 units, and Xreq=day 8) is processed in relation to table 700 of FIG. 7. Only the differences from table 700, and required computations are described briefly in detail.

The item demand (of row 891) on day 8 is incremented by 65, family bucketed allocation (of row 871) on day (Xreq=day 8) is incremented by 35, and item-B bucketed allocation (of row 892) is incremented by 30 on day 5. First the modifications corresponding to family are described then the modifications corresponding to item-B is described.

The net family available (of row 872) on day 8 is equal to −15 (family supply (equal to 20) less family bucketed allocation (equal to 35) corresponding to day 8). Backward consumption (of row 873) for day 8 equals 0 (as zero quantity is available to be consumed from day 6 and 7 to satisfy the demand on day 8). Net+backward consumption (of row 874) on day 8 is equal to −15 (adding corresponding values of row 872 and 873).

Forward consumption (of row 875) on day 8 equals 15, indicates that a supply from a future day (not shown) is required to be consumed to satisfy the family bucketed allocation quantity (of 35 units). Present family availability (of row 878) corresponding to day 8 is equal to 0 (as the sum of corresponding values in row 874 and 875 equals 0). It may be, appreciated that unavailable quantity of 15 units (shown within brackets) is indicated in the family bucketed allocation (of row 871), and only scheduled quantity of units available is indicated corresponding to member item-B within the ATF duration.

Item-B bucketed allocation (of row 892) at ATF point (on day 5) equals 30 (as indicated in step 491). The net item-B available (of row 893) is equal to −20 (corresponding value of row 890 (equal to 10) less the value in row 892 (equal to 30)). Backward consumption (of row 894) is equal to −10 on day 3 indicating that 10 units available on day 3 is consumed by the demand of 30 units on day 5, similarly, backward consumption for day 4 is also shown equal to −10. Backward consumption on day 5 is equal to 20, as 10 units from each of days 3 and 4 is consumed by the item-B bucketed allocation on day 5.

Net+backward consumption (of row 895) on days 3, 4, and 5 are respectively equal to 0 (sum of corresponding values in row 893 and 894). Present item-B availability (of row 898) on days 3, 4, and 5 are respectively equal to 0 (sum of corresponding values in row 895 and 896). The cumulative item-B availability on days 3, 4, and 5 equals 0 (within ATF duration) and on days 6, 7 and 8 is respectively equal to 0. The cumulative item availability may be computed as described above with reference to row 799 of FIG. 7.

The description is continued with reference to processing an order when the required date is within the ATF duration and required quantity (Qreq) of item-A is not scheduled to be available as of the required date.

11. Processing Orders when the Required Date is within ATF Duration and the Required Quantity is not Scheduled to be Available For illustration, it is assumed that an order for 20 units of item-A with a required date (Xreq=day 1) is received when the status is represented by FIG. 8. Order processing system 150 determines that the required date (Xreq) is within the ATF duration in step 435. Control accordingly passes to step 437, in which order processing system 150 examines cumulative item-A availability 889 on day 1 (equal to 0) to determine that sufficient quantity of ordered item is not available to promise the order.

Again assuming that the override flag is set (step 459), control is eventually transferred to step 463 (via steps 437, 440, 449, 450, and 459). In step 463, Qatf (equaling 10) is allocated on Xreq (day 1), and the remaining quantity (20−10=10) is allocated on ATF+1 day, which equals day 6. The allocation on ATF+1 are indicated to be unavailable, as represented by parenthesis around 10 in day 6, row 971. Various entries of table 800 may need to be modified after promising the above-noted order. The modifications of table 900 from table 800 is described below.

FIG. 9 is shown containing table 900 representing the values of various entries once the above noted order (Qreq=20 units, and Xreq=day 1) is processed in relation to table 800 of FIG. 8. Only the differences from table 800, and required computations are described briefly in detail.

The item demand (of row 981) on day 1 is incremented by 20, family bucketed allocation (of row 971) on day 6 is incremented by 10 (shown within brackets, indicating sufficient supplies are not available to meet the demand), and item-A bucketed allocation (of row 982) is incremented by 10 on day 1. First the modifications corresponding to family are described then the modifications corresponding to item-A is described.

The net family available (of row 972) on day 6 is equal to 10 (family supply (equal to 20) less family bucketed allocation (equal to 10) corresponding to day 6). Net+backward consumption (of row 974) on day 6 is equal to 0 (adding corresponding values of row 972 and 973) as backward consumption (of row 973) for day 6 equals −10 (as only 10 units (out of 20 available on day 6) may be made available to meet the shortage on day 7). Similarly, Net+backward consumption on day 7 equals −10 (−20+10), as backward consumption on day 7 equals 10 (as only 10 units available on day 6 are consumed to meet the shortage on day 7).

Forward consumption (of row 975) on day 7 equals 10, indicating that a supply (of 10 units) from a future day (not shown) is required to be consumed to satisfy the family bucketed allocation quantity (of 40 units). It may be appreciated that unavailable quantity of 10 units (shown within parenthesis/brackets) is indicated in the family bucketed allocation (of row 971), resulting in only available quantity of units (i.e., 10 units available within the ATF duration is indicated on Xreq=1) to be indicated corresponding to member item-A within the ATF duration.

Item-A bucketed allocation (of row 982) on day 1 (within the ATF point) equals 10. The net item-A available (of row 983) is equal to 0 (corresponding value of row 980 (equal to 10) less the value in row 982 (equal to 10)). Net+backward consumption (of row 985) on day 1 is equal to 0 (sum of corresponding values in row 983 and 984) as backward consumption (of row 984) is equal to 0 on day 1 indicating that 0 units are consumed from supplies available prior to day 1 and 0 units are supplied to meet the shortage on a future date. Net+Backward consumption on day 3 is equal to −10 as backward consumption is equal to 10 (as only 10 units available on day 2 is consumed to meet demand on day 3).

Forward consumption (of row 986) on day 1 equals 0 (indicating that a supply of 0 units is consumed from a future day (i.e., day 4) to meet the shortage on day 1 and 0 units are made available to meet the shortage on a previous days prior to day 1) and that of day 4 equals −10, as 10 units are made available to meet the shortage on a previous day (i.e., day 3). Forward consumption on day 3 is equals 10 (indicating that 10 units are consumed from supplies available on a future day (day 4)). Present item-A availability (of row 988) on day 4 is equal to 0 (sum of corresponding values in row 985 and 986). The cumulative item-A availability on each of the days 4-8 (before and after ATF) equals 0. The cumulative item availability may be computed as described above with reference to row 889 of FIG. 8.

Thus, orders may be accepted with the expectation that the required date is not being committed to, but that an attempt will be made to commit to the required date. Order processing system 150 may commit to the required date, for example, if previously promised orders are unscheduled, as described below with an example.

12. Unscheduling Order which was Allocated Quantity Only within ATF Duration

It may be appreciated that quantity of a member item which is scheduled to be available within the ATF duration, may be optimally used to produce items of the same member item only. Thus, the freed items are used to satisfy demand related to orders requiring the specific same member item only.

For illustration, it is assumed that an order with a required quantity of 30 units of member-A and a requested day of day 3 is un-scheduled when the status is as depicted in FIG. 9. From FIG. 6A, it may be appreciated that all the 30 units were allocated based on quantities scheduled to be available within ATF duration. The unmet demand of 10 units in day 6 is caused due to order for member item-A as described above with reference to FIG. 9.

Thus, the un-scheduled quantity of member item-A may be utilized to satisfy the unmet demand for allocations of 10 units indicated within brackets in row 971 on day 6. The remaining freed 20 units are shown to be available for future orders, as may be observed in row 1089 of FIG. 10.

The table of FIG. 10 contains the status of the table after meeting such demand. Only the differences of table 1000 (of FIG. 10) from table 900 are described for conciseness. First the modifications corresponding to family are described then the modifications corresponding to item-A is described.

The family bucketed allocation (of row 1071) on day 6 is decremented by 10 resulting in 0 allocation on day 6, and item-A bucketed allocation (of row 1082) on day 1 is incremented by 10 resulting in item-A bucketed demand equaling 20. The net family available (of row 1072) on day 6 is equal to 20 (family supply (equal to 20) less family bucketed allocation (equal to 0) corresponding to day 6).

Net+backward consumption (of row 1074) on day 6 is equal to 0 (adding corresponding values of row 1072 and 1073) as backward consumption (of row 1073) for day 6 remains unchanged (equals −20). Forward consumption (of row 1075) on day 6 equals 0, indicates that no supply from a future day is consumed as the family bucketed allocation quantity is equal to 0.

The net item-A available (of row 1083) is equal to −10 (corresponding value of row 1080 (equal to 10) less the value in row 1082 (equal to 20)). Backward consumption (of row 1084) on day 1 is now equal to 0 (as 0 units are consumed from previous days supply to satisfy the demand on day 1 and 0 units are made available to satisfy demand on a future day), similarly, backward consumption on days 2 to 5 equals 0. Net+backward consumption (of row 1085) on day 2 and 3 is equal to 10 (sum of corresponding values in row 1083 and 1084).

Forward consumption (of row 1086) on day 1 equals 10 (indicating that a supply of 10 units is consumed from a future day (i.e., day 2) to meet the shortage on day 1 and 0 units are made available to meet the shortage on a previous days prior to day 1) and that of day 2 equals −10, as 10 units are made available to meet the shortage on a previous day (i.e., day 1). Present item-A availability (of row 1088) on day 3 and 4 is equal to 10 (sum of corresponding values in row 1085 and 1086). The cumulative item-A availability on days 3, 4, and 5 (within ATF duration) is respectively equal to 10, 20, and 20, and on days 6, 7 and 8 (after ATF duration) is respectively equal to 20.

An unscheduled quantity within the ATF duration may be utilized to satisfy an accepted order corresponding to a member item (e.g., member item A) as described above. Order processing system 150 may commit to the required date, for example, if previously promised orders after ATF duration are unscheduled, and is described below with an example.

12. Unscheduling Order which was Allocated Quantity Both within and after ATF Duration As may be appreciated, when the freed quantity is scheduled to be available in the post-ATF duration, the freed quantity can be used for satisfying the demands of orders related to any member item. On the other hand, as illustrated above with reference to FIG. 10, if the freed quantity is scheduled to be available within the ATF duration, the freed quantity can be used for satisfying orders related to the same member item (as the member item of the unscheduled order).

When an unscheduled order is based on quantities in both pre and post ATF point, the two different portions of quantities are treated differently. That is, the portion scheduled to be available within the ATF duration is first used to satisfy the demands related to the orders of the same member item, and then the portion scheduled to be available after the ATF duration is used to satisfy the demands related to the orders of any member item.

For illustration, it is assumed that an order with a required quantity of 50 units of member-A and a requested day of day 7 (i.e., after ATF duration) is un-scheduled when the status is as in FIG. 10. Of the 50 units, 40 units are allocated from family availability and 10 units are allocated from member-A item availability as described above with reference to FIG. 8.

Figure 11:
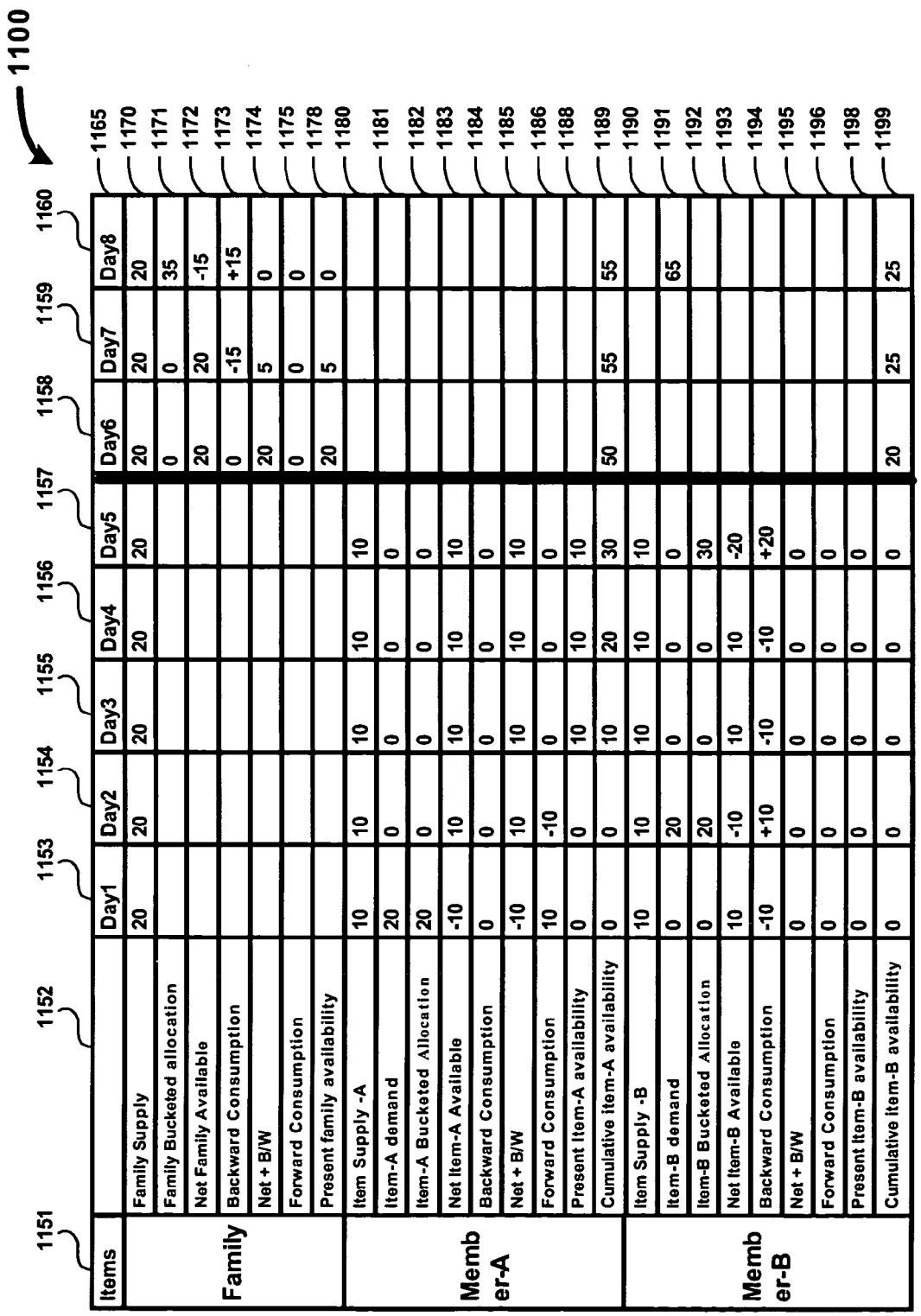
FIG. 11 is shown containing a table illustrating the processing of an order, promised earlier using units (from family availability) which are scheduled to be available after ATF duration, which is now unscheduled.

The table of FIG. 11 contains the status of the table after un-scheduling the request. Only the differences of table 1100 (of FIG. 11) from table 1000 is described for conciseness. First the modifications corresponding to family are described then the modifications corresponding to item-A is described.

Thus, the 10 units are first processed and indicated to be available, as depicted in row 1189. The 40 units are used to satisfy the unmet demand of 15 units indicated within brackets in row 1071 on day 8. The remaining 25 units are indicated as being available. If the unmet demand exceeds the available units, some priority order (e.g., based on the committed date) may be used to allocate the available units.

The family bucketed allocation (of row 1171) on day 7 is decremented by 40 resulting in 0 allocation on day 7, and item-A bucketed allocation (of row 1182) on day 5 is decremented by 10 resulting in item-A bucketed demand equaling 0. The net family available (of row 1172) on day 7 is equal to 20 (family supply (equal to 20) less family bucketed allocation (equal to 0) corresponding to day 7).

Net+backward consumption (of row 1174) on day 6 is equal to 20 (adding corresponding values of row 1172 and 1173) as backward consumption (of row 1173) for day 6 equals 0 (as the allocated 40 units on day 7 is now equal to zero due to 50 units of member item-A unscheduled on day 7). Similarly, Net+backward consumption for day 7 and 8 respectively equals 5 and 0 as backward consumption (of row 1173) for day 7 equals +15 (as 15 units available on day 7 are consumed by unmet demand of 15 on day 8) and that of day 8 equals +15 (as 15 units are consumed from day 7).

Forward consumption (of row 1175) on day 8 equals 0, indicates that no supply from a future day is consumed. Present family availability (of row 1180) on day 6 equals 20 (by adding corresponding values in row 1175 and 1178 on day 6). Similarly, present family availability on day 7 and 8 equals 5 and 0.

Item-A demand (of row 1181) on day 7 is decremented by 50 units due to un-scheduling as noted above. Item-A bucketed allocation (of row 1182) on day 5 is decremented by 10 units (due to 50 units unscheduled on day 7). The net item-A available (of row 1183) on day 5 equals 10 (corresponding value of row 1180 (equal to 10) less the value in row 1182 (equal to 0)). Net+backward consumption (of row 1185) on day 5 is equal to 10 (sum of corresponding values in row 1183 and 1184).

Present item-A availability (of row 1188) on day 5 is equal to 10 (sum of corresponding values in row 1185 and 1186). The cumulative item-A availability (of row 1189) on day 5 (within ATF duration) is 30, and on days 6, 7 and 8 (after ATF duration) is respectively equal to 50, 55, and 55 and cumulative item-B availability (of row 1199) on days 6, 7 and 8 (after ATF duration) is respectively equal to 20, 25, and 25.

It should be understood the order processing system 150 may need to maintain various data structures or use structured storage techniques (e.g., databases) to provide various features described above. Such implementations will be apparent to one skilled in the relevant arts by reading the disclosure provided herein.

Thus, an order processing system 150 implementing a supply chain management system processes orders to determine whether an order related to members of the family can be promised according to several aspects of the present invention.

14. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of processing orders related to a family of products in a supply chain management system, said family of products containing a plurality of member items, said plurality of member items having similarities in resource requirements, said method comprising:
   receiving in a computer system a time fence (TF) duration associated with each of said plurality of member items in pair with a first member item, wherein said first member item is also contained in said plurality of member items of said family, wherein said TF duration associated with a member item in pair with said first member item represents an amount of advance time duration after which the supply of that member item is available to satisfy the demand for said first member item;
   receiving in said computer system a first order specifying a first required quantity of said first member item and a first required date, wherein said first required date is after said TF duration from a time said first order is received, and wherein only Qavail units of said first member item are scheduled to be available as of said first required date, wherein Qavail is less than said first required quantity;
   determining in said computer system a first available quantity of all of said plurality of member items scheduled to be available after said TF duration and as of said first required date, and a second available quantity of said first member item scheduled to be available as of end of said TF duration; and
   indicating in said computer system that said first order be promised if said determining determines that said first available quantity and said second available quantity scheduled to be available as of said first required date is sufficient to fulfill said first required quantity.

2. The method of claim 1, wherein said TF duration equals aggregate TF (ATF) duration when said TF duration is equal for all pairs of member items.

3. The method of claim 2, if said determining determines that at least said first required quantity of all of said plurality of member items is not scheduled to be available as of said first required date, further comprising:
   computing an ATP date in which said first required quantity of said first member item will be available based on said available first required quantity and said available second quantity; and
   accepting said first order with a promise date equaling said ATP date.

4. The method of claim 3, wherein a user is provided an option to indicate whether said ATP date is acceptable, wherein said accepting is performed only if said user indicates that said ATP date is acceptable.

5. The method of claim 3, further comprising:
   if said first required quantity is greater than Qatp less Qatf, allocating Qatp less Qatf on said first required date from all of said plurality of member items and allocating Qreq minus Qatp less Qatf at an end day of said ATF duration from said first member item,
   if said first required quantity is less than or equal to Qatp less Qatf, allocating said first required quantity on said ATP date,
   wherein Qatp represents the aggregate available units as of said ATP date from all of said plurality of member items, Qatf represents the aggregate available units of said first member item at the end of said ATF duration, and Qreq equals said first required quantity.

6. The method of claim 3, further comprising:
   checking whether an override flag is associated with said first order; and
   accepting said first order if said override flag is associated with said first order even if said determining determines that at least said first required quantity cannot be fulfilled as of said first required date,
   wherein said computing and accepting with said promise date are performed only if said override flag is not associated with said first order.

7. The method of claim 6, further comprising rejecting said order if said override flag is not associated with said first order and if said ATP date is not acceptable to a user placing said first order.

8. The method of claim 6, if said override flag is associated with said first order, further comprising:
   allocating Qreq less Qatf on said first requested date and Qatf on the last day of said ATF duration, wherein Qatf represents the aggregate available units of said first member item at the end of said ATF duration, and Qreq equals said first required quantity.

9. The method of claim 2, further comprising:
   computing in said computer system said first available quantity as an aggregate of a present family availability, indicated by an aggregate quantity of all of said plurality of member items available on each day after said ATF duration, as of said first required date;
   allocating in said computer system a first portion from said present family availability and a second portion from said second available quantity scheduled to be available for said first member item as of end of said ATF duration.

10. The method of claim 9, further comprising:

computing in said computer system an aggregate of availability for said first member item for each day as of end of said ATF duration in order to compute said second available quantity;

maintaining in said computer system said present family availability associated with each day after said ATF duration; and computing a cumulative item availability for each day after the ATF duration as the sum of said second available quantity and aggregate of said present family availability as of that day, wherein said determining comprises examining said cumulative item availability and said present family availability such that said determining can be performed quickly.

11. The method of claim 10, wherein said determining comprises:

performing a first comparison of said first required quantity and difference of said cumulative item availability as of said required date and said second available quantity as of the end of said ATF duration;

if said first comparison provides a less than result, said second portion equaling 0, and said first portion being allocated from aggregate of said present family availability as of said first required date; and if said first comparison provides a greater than or equal to result, said first portion equaling difference of said cumulative item availability as of said required date and said available second quantity as of the end of said ATF duration, and said second portion equaling said first required quantity less said first portion.

12. The method of claim 2, further comprising:

receiving in said computer system a third order specifying a third quantity of said first member item and a third required date, wherein said third required date is within said ATF duration, wherein said third quantity is less than or equal to said second available quantity of said first member item as on said third required date; and promising in said computer system that said third order can be promised.

13. The method of claim 2, further comprising:

receiving in said computer system a fourth order specifying a fourth quantity of said first member item and a fourth required date, wherein said fourth required date is within said ATF duration, wherein said fourth quantity is greater than said second available quantity of said first member item as on said fourth required date;

determining said second available quantity, Qatf, at the end of said ATF duration;

checking if said fourth quantity is less than or equal to said Qatf; and if said fourth quantity is less than or equal to said Qatf, checking in said computer system whether a first override flag is associated with said fourth order, and allocating said fourth quantity on said fourth required date if said first override flag is associated with said fourth order.

14. The method of claim 13, if said fourth quantity is less than or equal to said Qatf and if said override flag is not associated with said fourth order, further comprising:

determining a date Xatp on which said fourth quantity is available; and accepting said fourth order only if a promise date of said Xatp is acceptable to a user placing said fourth order.

15. The method of claim 14, further comprising rejecting said fourth order if said override flag is not associated with said fourth order and if said Xatp is not acceptable as said promise date to said user.

16. The method of claim 13, if said fourth quantity is greater than said Qatf, further comprising:

checking whether an override flag is associated with said fourth order;

if said override flag is associated with said fourth order, allocating Qatf on said fourth required date and said fourth required quantity less said Qatf on a day following said ATF duration.

17. The method of claim 16, if said fourth quantity is greater than said Qatf and if said override flag is not associated with said fourth order, said method comprising:

computing in said computer system a date Xatp after said fourth required date and a corresponding Qatp on which said fourth quantity is available;

checking in the said computer system whether said Xatp is acceptable as a promise date; and rejecting said fourth order if said Xatp is not acceptable as a promise date.

18. The method of claim 17, if said Xatp is acceptable as a promise date, further comprising:

performing a fourth comparison in said computer system to determine whether said fourth quantity is less than or equal to Qatp minus Qatf;

if said fourth quantity is less than Qatp minus Qatf, allocating said fourth quantity on said ATP date;

if said fourth quantity is greater than Qatp minus Qatf, allocating said Qatp minus Qatf on said ATP date and said fourth quantity minus Qatp plus Qatf on last day of said ATF duration.

19. The method of claim 2, further comprising:

receiving a request to un-schedule one of a previously promised orders;

determining whether said previously promised order is based on a tenth quantity scheduled to be available within said ATF duration;

using said tenth quantity to meet unmet demands related to the same member item as the member item for which said previously promised order relates to.

20. The method of claim 19, further comprising:

determining whether said previously promised order is based on an eleventh quantity scheduled to be available after said ATF duration;

using said tenth quantity to meet unmet demands related to any of said plurality of member items.

21. A computer readable storage medium carrying one or more sequences of instructions for causing a computer system to process orders related to a family of products in a supply chain management system, said family of products containing a plurality of member items, said plurality of member items having similarities in resource requirements, wherein execution of said one or more sequences of instructions by one or more processors contained in said computer system causes said one or more processors to perform the actions of:

receiving in a computer system a time fence (TF) duration associated with each of said plurality of member items in pair with a first member item, wherein said first member item is also contained in said plurality of member items of said family, wherein, said TF duration associated with a member item in pair with said first member item represents an amount of advance time duration after which the supply of that member item is available to satisfy the demand for said first member item;

receiving a first order specifying a first required quantity of said first member item and a first required date, wherein said first required date is after said ATF duration from a time said first order is received, and wherein only Qavail units of said first member item are scheduled to be available as of said first required date, wherein Qavail is less than said first required quantity;

determining a first available quantity of all of said plurality of member items scheduled to be available after said TF duration and as of said first required date, and a second available quantity of said first member item scheduled to be available as of end of said TF duration; and indicating that said first order be promised if said determining determines that said first available quantity and said second available quantity scheduled to be available as of said first required date is sufficient to fulfill said first required quantity.

22. The computer readable storage medium of claim 21, wherein said TF duration equals aggregate TF (ATF) duration when said TF duration is equal for all pairs of member items.

23. The computer readable storage medium of claim 22, if said determining determines that at least said first required quantity of all of said plurality of member items is not scheduled to be available as of said first required date, further comprising:

computing an ATP date in which said first required quantity of said first member item will be available based on said available first required quantity and said available second quantity; and accepting said first order with a promise date equaling said ATP date.

24. The computer readable storage medium of claim 23, wherein a user is provided an option to indicate whether said ATP date is acceptable, wherein said accepting is performed only if said user indicates that said ATP date is acceptable.

25. The computer readable storage medium of claim 23, further comprising:

if said first required quantity is greater than Qatp less Qatf, allocating Qatp less Qatf on said first required date from all of said plurality of member items and allocating Qreq minus Qatp less Qatf at an end day of said ATF duration from said first member item, if said first required quantity is less than or equal to Qatp less Qatf, allocating said first required quantity on said ATP date, wherein Qatp represents the aggregate available units as of said ATP date from all of said plurality of member items, Qatf represents the aggregate available units of said first member item at the end of said ATF duration, and Qreq equals said first required quantity.

26. The computer readable storage medium of claim 23, further comprising:

checking whether an override flag is associated with said first order; and accepting said first order if said override flag is associated with said first order even if said determining determines that at least said first required quantity cannot be fulfilled as of said first required date, wherein said computing and accepting with said promise date are performed only if said override flag is not associated with said first order.

27. The computer readable storage medium of claim 26, further comprising rejecting said order if said override flag is not associated with said first order and if said ATP date is not acceptable to a user placing said first order.

28. The computer readable storage medium of claim 26, if said override flag is associated with said first order, further comprising:

allocating Qreq less Qatf on said first requested date and Qatf on the last day of said ATF duration, wherein Qatf represents the aggregate available units of said first member item at the end of said ATF duration, and Qreq equals said first required quantity.

29. The computer readable storage medium of claim 22, further comprising:

computing in said computer system said first available quantity as an aggregate of a present family availability, indicated by an aggregate quantity of all of said plurality of member items available on each day after said ATF duration, as of said first required date; and allocating in said computer system a first portion from said present family availability and a second portion from said second available quantity scheduled to be available for said first member item as of end of said ATF duration.

30. The computer readable storage medium of claim 29, further comprising:

computing in said computer system an aggregate availability for said first member item for each day as of end of said ATF duration in order to compute said second available quantity;

maintaining in said computer system said present family availability associated with each day after said ATF duration; and computing a cumulative item availability for each day after the ATF duration as the sum of said second available quantity and aggregate of said present family availability as of that day, wherein said determining comprises examining said cumulative item availability and said present family availability such that said determining can be performed quickly.

31. The computer readable storage medium of claim 30, wherein said determining comprises:

performing a first comparison of said first required quantity and difference of said cumulative item availability as of said required date and said second available quantity as of the end of said ATF duration;

if said first comparison provides a less than result, said second portion equaling 0, and said first portion being allocated from aggregate of said present family availability as of said first required date; and if said first comparison provides a greater than or equal to result, said first portion equaling difference of said cumulative item availability as of said required date and said available second quantity as of the end of said ATF duration, and said second portion equaling said first required quantity less said first portion.

32. The computer readable storage medium of claim 22, further comprising:

receiving in said computer system a third order specifying a third quantity of said first member item and a third required date, wherein said third required date is within said ATF duration, wherein said third quantity is less than or equal to said second available quantity of said first member item as on said third required date; and promising in said computer system that said third order can be promised.

33. The computer readable storage medium of claim 22, further comprising:

receiving in said computer system a fourth order specifying a fourth quantity of said first member item and a fourth required date, wherein said fourth required date is within said ATF duration, wherein said fourth quantity is greater than said second available quantity of said first member item as on said fourth required date;

determining said second available quantity, Qatf, at the end of said ATF duration;

checking if said fourth quantity is less than or equal to said Qatf; and if said fourth quantity is less than or equal to said Qatf, checking in said computer system whether a first override flag is associated with said fourth order, and allocating said fourth quantity on said fourth required date if said first override flag is associated with said fourth order.

34. The computer readable storage medium of claim 33, if said fourth quantity is less than or equal to said Qatf and if said override flag is not associated with said fourth order, further comprising:

determining a date Xatp on which said fourth quantity is available; and accepting said fourth order only if a promise date of said Xatp is acceptable to a user placing said fourth order.

35. The computer readable storage medium of claim 34, further comprising rejecting said fourth order if said override flag is not associated with said fourth order and if said Xatp is not acceptable as said promise date to said user.

36. The computer readable storage medium of claim 33, if said fourth quantity is greater than said Qatf, further comprising:

checking whether an override flag is associated with said fourth order;

if said override flag is associated with said fourth order, allocating Qatf on said fourth required date and said fourth required quantity less said Qatf on a day following said ATF duration.

37. The computer readable storage medium of claim 36, if said fourth quantity is greater than said Qatf and if said override flag is not associated with said fourth order, further comprising:

computing in said computer system a date Xatp after said fourth required date and a corresponding Qatp on which said fourth quantity is available;

checking in the said computer system whether said Xatp is acceptable as a promise date; and rejecting said fourth order if said Xatp is not acceptable as a promise date.

38. The computer readable storage medium of claim 37, if said Xatp is acceptable as a promise date, further comprising:

performing a fourth comparison in said computer system to determine whether said fourth quantity is less than or equal to Qatp minus Qatf;

if said fourth quantity is less than Qatp minus Qatf, allocating said fourth quantity on said ATP date;

if said fourth quantity is greater than Qatp minus Qatf, allocating said Qatp minus Qatf on said ATP date and said fourth quantity minus Qatp plus Qatf on last day of said ATF duration.

39. The computer readable storage medium of claim 22, further comprising:

receiving a request to un-schedule one of a previously promised orders;

determining whether said previously promised order is based on a tenth quantity scheduled to be available within said ATF duration;

using said tenth quantity to meet unmet demands related to the same member item as the member item for which said previously promised order relates to.

40. The computer readable storage medium of claim 39, further comprising:

determining whether said previously promised order is based on an eleventh quantity scheduled to be available after said ATF duration;

using said tenth quantity to meet unmet demands related to any of said plurality of member items.

41. A computer system supporting a Supply Chain Management (SCM) system processing orders related to a family of products in said SCM system, said family of products containing a plurality of member items, said plurality of member items having similarities in resource requirements, said computer system being operable to:

receive in a computer system a time fence (TF) duration associated with each of said plurality of member items in pair with a first member item, wherein said first member item is also contained in said plurality of member items of said family, wherein said TF duration associated with a member item in pair with said first member item represents an amount of advance time duration after which the supply of that member item is available to satisfy the demand for said first member item;

receive in said computer system a first order specifying a first required quantity of said first member item and a first required date, wherein said first required date is after said TF duration from a time said first order is received, and wherein only Qavail units of said first member item are scheduled to be available as of said first required date, wherein Qavail is less than said first required quantity;

determine in said computer system a first available quantity of all of said plurality of member items scheduled to be available after said TF duration and as of said first required date, and a second available quantity of said first member item scheduled to be available as of end of said TF duration; and indicate in said computer system that said first order be promised if said determining determines that said first available quantity and said second available quantity scheduled to be available as of said first required date is sufficient to fulfill said first required quantity.

42. The computer system of claim 41, wherein said TF duration equals aggregate TF (ATF) duration when said TF duration is equal for all pairs of member items.

43. The computer system of claim 42, if said determine determines that at least said first required quantity of all of said plurality of member items is not scheduled to be available as of said first required date, said computer system being further operable to:

compute an ATP date in which said first required quantity of said first member item will be available based on said available first required quantity and said available second quantity; and accept said first order with a promise date equaling said ATP date.

44. The computer system of claim 43, wherein a user is provided an option to indicate whether said ATP date is acceptable, wherein said accept is performed only if said user indicates that said ATP date is acceptable.

45. The computer system of claim 43, said computer system being further operable to:

if said first required quantity is greater than Qatp less Qatf, allocate Qatp less Qatf on said first required date from all of said plurality of member items and allocating Qreq minus Qatp less Qatf at an end day of said ATF duration from said first member item, if said first required quantity is less than or equal to Qatp less Qatf, allocate said first required quantity on said ATP date, wherein Qatp represents the aggregate available units as of said ATP date from all of said plurality of member items, Qatf represents the aggregate available units of said first member item at the end of said ATF duration, and Qreq equals said first required quantity.

46. The computer system of claim 43, said computer system being further operable to:
check whether an override flag is associated with said first order; and
accept said first order if said override flag is associated with said first order even if said determining determines that at least said first required quantity cannot be fulfilled as of said first required date,
wherein said computing and accepting with said promise date are performed only if said override flag is not associated with said first order.

47. The computer system of claim 46, said computer system being further operable to reject said order if said override flag is not associated with said first order and if said ATP date is not acceptable to a user placing said first order.

48. The computer system of claim 46, if said override flag is associated with said first order, said computer system being further operable to:
allocate Qreq less Qatf on said first requested date and Qatf on the last day of said ATF duration, wherein Qatf represents the aggregate available units of said first member item at the end of said ATF duration, and Qreq equals said first required quantity.

49. The computer system of claim 42, said computer system being further operable to:
compute in said computer system said first available quantity as an aggregate of a present family availability, indicated by an aggregate quantity of all of said plurality of member items available on each day after said ATF duration, as of said first required date; and
allocate in said computer system a first portion from said present family availability and a second portion from said second available quantity scheduled to be available for said first member item as of end of said ATF duration.

50. The computer system of claim 49, said computer system being further operable to:
compute in said computer system an aggregate of availability for said first member item for each day as of end of said ATF duration in order to compute said second available quantity;
maintain in said computer system said present family availability associated with each day after said ATF duration; and
compute a cumulative item availability for each day after the ATF duration as the sum of said second available quantity and aggregate of said present family availability as of that day,
wherein said determine comprises examining said cumulative item availability and said present family availability such that said determining can be performed quickly.

51. The computer system of claim 50, wherein said determine comprises:
performing a first comparison of said first required quantity and difference of said cumulative item availability as of said required date and said second available quantity as of the end of said ATF duration;
if said first comparison provides a less than result, said second portion equaling 0, and said first portion being allocated from aggregate of said present family availability as of said first required date; and
if said first comparison provides a greater than or equal to result, said first portion equaling difference of said cumulative item availability as of said required date and said available second quantity as of the end of said ATF duration, and said second portion equaling said first required quantity less said first portion.

52. The computer system of claim 42, said computer system being further operable to:
receive in said computer system a third order specifying a third quantity of said first member item and a third required date, wherein said third required date is within said ATF duration, wherein said third quantity is less than or equal to said second available quantity of said first member item as on said third required date; and
promise in said computer system that said third order can be promised.

53. The computer system of claim 42, said computer system being further operable to:
receive in said computer system a fourth order specifying a fourth quantity of said first member item and a fourth required date, wherein said fourth required date is within said ATF duration, wherein said fourth quantity is greater than said second available quantity of said first member item as on said fourth required date;
determine said second available quantity, Qatf, at the end of said ATF duration;
check if said fourth quantity is less than or equal to said Qatf; and
if said fourth quantity is less than or equal to said Qatf, checking in said computer system whether a first override flag is associated with said fourth order, and allocate said fourth quantity on said fourth required date if said first override flag is associated with said fourth order.

54. The computer system of claim 53, if said fourth quantity is less than or equal to said Qatf and if said override flag is not associated with said fourth order, said computer system being further operable to:
determine a date Xatp on which said fourth quantity is available; and
accept said fourth order only if a promise date of said Xatp is acceptable to a user placing said fourth order.

55. The computer system of claim 54, said computer system being further operable to reject said fourth order if said override flag is not associated with said fourth order and if said Xatp is not acceptable as said promise date to said user.

56. The computer system of claim 53, if said fourth quantity is greater than said Qatf, said computer system being further operable to:
check whether an override flag is associated with said fourth order;
if said override flag is associated with said fourth order, allocate Qatf on said fourth required date and said fourth required quantity less said Qatf on a day following said ATF duration.

57. The computer system of claim 56, if said fourth quantity is greater than said Qatf and if said override flag is not associated with said fourth order, said computer system being further operable to:
compute in said computer system a date Xatp after said fourth required date and a corresponding Qatp on which said fourth quantity is available;
check in the said computer system whether said Xatp is acceptable as a promise date; and
reject said fourth order if said Xatp is not acceptable as a promise date.

58. The computer system of claim 57, if said Xatp is acceptable as a promise date, said computer system being further operable to:

perform a fourth comparison in said computer system to determine whether said fourth quantity is less than or equal to Qatp minus Qatf;

if said fourth quantity is less than Qatp minus Qatf, allocate said fourth quantity on said ATP date;

if said fourth quantity is greater than Qatp minus Qatf, allocate said Qatp minus Qatf on said ATP date and said fourth quantity minus Qatp plus Qatf on last day of said ATF duration.

59. The computer system of claim 42, said computer system being further operable to:

receive a request to un-schedule one of a previously promised orders;

determine whether said previously promised order is based on a tenth quantity scheduled to be available within said ATF duration;

use said tenth quantity to meet unmet demands related to the same member item as the member item for which said previously promised order relates to.

60. The computer system of claim 59, said computer system being further operable to:

determine whether said previously promised order is based on an eleventh quantity scheduled to be available after said ATF duration;

use said tenth quantity to meet unmet demands related to any of said plurality of member items.

61. A computer system supporting a Supply Chain Management (SCM) system processing orders related to a family of products in said SCM system, said family of products containing a plurality of member items, said plurality of member items having similarities in resource requirements, said computer system comprising:

means for receiving in a computer system a time fence (TF) duration associated with each of said plurality of member items in pair with a first member item, wherein said first member item is also contained in said plurality of member items of said family, wherein said TF duration associated with a member item in pair with said first member item represents an amount of advance time duration after which the supply of that member item is available to satisfy the demand for said first member item;

means for receiving a first order specifying a first required quantity of said first member item and a first required date, wherein said first required date is after said ATF duration from a time said first order is received, and wherein only Qavail units of said first member item are scheduled to be available as of said first required date, wherein Qavail is less than said first required quantity;

means for determining a first available quantity of all of said plurality of member items scheduled to be available after said TF duration and as of said first required date, and a second available quantity of said first member item scheduled to be available as of end of said TF duration;

means for indicating that said first order be promised if said means for determining determines that said first available quantity and said second available quantity scheduled to be available as of said first required date is sufficient to fulfill said first required quantity, wherein said means for said indicating further comprises means for allocating a maximum portion of said first required quantity from said first available quantity and allocating said first required quantity minus said maximum portion from said second available quantity.

62. The computer system of claim 61, wherein said TF duration equals aggregate TF (ATF) duration when said TF duration is equal for all pairs of member items.

63. The computer system of claim 62, if said means determining determines that at least said first required quantity of all of said plurality of member items is not scheduled to be available as of said first required date, said computer system further comprising:

means for computing an ATP date in which said first required quantity of said first member item will be available based on said available first required quantity and said available second quantity; and means for accepting said first order with a promise date equaling said ATP date.

64. The computer system of claim 63, wherein a user is provided an option to indicate whether said ATP date is acceptable, wherein said means for accepting accepts said first order only if said user indicates that said ATP date is acceptable.

65. The computer system of claim 63, further comprising:

if said first required quantity is greater than Qatp less Qatf, means for allocating Qatp less Qatf on said first required date from all of said plurality of member items and allocating Qreq minus Qatp less Qatf at an end day of said ATF duration from said first member item, if said first required quantity is less than or equal to Qatp less Qatf, means for allocating said first required quantity on said ATP date, wherein Qatp represents the aggregate available units as of said ATP date from all of said plurality of member items, Qatf represents the aggregate available units of said first member item at the end of said ATF duration, and Qreq equals said first required quantity.

66. The computer system of claim 63, further comprising:

means for checking whether an override flag is associated with said first order; and means for accepting said first order if said override flag is associated with said first order even if said determining determines that at least said first required quantity cannot be fulfilled as of said first required date, wherein said computing and accepting with said promise date are performed only if said override flag is not associated with said first order.

67. The computer system of claim 66, further comprising means for rejecting said order if said override flag is not associated with said first order and if said ATP date is not acceptable to a user placing said first order.

68. The computer system of claim 66, if said override flag is associated with said first order, further comprising:

means for allocating Qreq less Qatf on said first requested date and Qatf on the last day of said ATF duration, wherein Qatf represents the aggregate available units of said first member item at the end of said ATF duration, and Qreq equals said first required quantity.

69. The computer system of claim 62, further comprising:

means for computing in said computer system said first available quantity as an aggregate of a present family availability, indicated by an aggregate quantity of all of said plurality of member items available on each day after said ATF duration, as of said first required date; and means for allocating in said computer system a first portion from said present family availability and a second portion from said second available quantity scheduled to be available for said first member item as of end of said ATF duration.

70. The computer system of claim 69, further comprising:

means for computing in said computer system an aggregate of availability for said first member item for each day as of end of said ATF duration in order to compute said second available quantity;

maintaining in said computer system said present family availability associated with each day after said ATF duration; and computing a cumulative item availability for each day after the ATF duration as the sum of said second available quantity and aggregate of said present family availability as of that day, wherein said determining comprises examining said cumulative item availability and said present family availability such that said determining can be performed quickly.

71. The computer system of claim 70, wherein said determining comprises:

means for performing a first comparison of said first required quantity and difference of said cumulative item availability as of said required date and said second available quantity as of the end of said ATF duration;

if said first comparison provides a less than result, said second portion equaling 0, and said first portion being allocated from aggregate of said present family availability as of said first required date; and if said first comparison provides a greater than or equal to result, said first portion equaling difference of said cumulative item availability as of said required date and said available second quantity as of the end of said ATF duration, and said second portion equaling said required first required quantity less said first portion.

72. The computer system of claim 62, further comprising:

means for receiving in said computer system a third order specifying a third quantity of said first member item and a third required date, wherein said third required date is within said ATF duration, wherein said third quantity is less than or equal to said second available quantity of said first member item as on said third required date; and means for promising in said computer system that said third order can be promised.

73. The computer system of claim 62, further comprising:

means for receiving in said computer system a fourth order specifying a fourth quantity of said first member item and a fourth required date, wherein said fourth required date is within said ATF duration, wherein said fourth quantity is greater than said second available quantity of said first member item as on said fourth required date;

means for determining said second available quantity, Qatf, at the end of said ATF duration;

means for checking if said fourth quantity is less than or equal to said Qatf; and if said fourth quantity is less than or equal to said Qatf, means for checking in said computer system whether a first override flag is associated with said fourth order, and allocating said fourth quantity on said fourth required date if said first override flag is associated with said fourth order.

74. The computer system of claim 73, if said fourth quantity is less than or equal to said Qatf and if said override flag is not associated with said fourth order, further comprising:

means for determining a date Xatp on which said fourth quantity is available; and means for accepting said fourth order only if a promise date of said Xatp is acceptable to a user placing said fourth order.

75. The computer system of claim 74, further comprising means for rejecting said fourth order if said override flag is not associated with said fourth order and if said Xatp is not acceptable as said promise date to said user.

76. The computer system of claim 73, if said fourth quantity is greater than said Qatf, further comprising:

means for checking whether an override flag is associated with said fourth order;

if said override flag is associated with said fourth order, means for allocating Qatf on said fourth required date and said fourth required quantity less said Qatf on a day following said ATF duration.

77. The computer system of claim 76, if said fourth quantity is greater than said Qatf and if said override flag is not associated with said fourth order, said computer system comprising:

means for computing in said computer system a date Xatp after said fourth required date and a corresponding Qatp on which said fourth quantity is available;

means for checking in the said computer system whether said Xatp is acceptable as a promise date; and means for rejecting said fourth order if said Xatp is not acceptable as a promise date.

78. The computer system of claim 77, if said Xatp is acceptable as a promise date, further comprising:

means for performing a fourth comparison in said computer system to determine whether said fourth quantity is less than or equal to Qatp minus Qatf;

if said fourth quantity is less than Qatp minus Qatf, allocating said fourth quantity on said ATP date;

if said fourth quantity is greater than Qatp minus Qatf, allocating said Qatp minus Qatf on said ATP date and said fourth quantity minus Qatp plus Qatf on last day of said ATF duration.

79. The computer system of claim 62, further comprising:

means for receiving a request to un-schedule one of a previously promised orders;

means for determining whether said previously promised order is based on a tenth quantity scheduled to be available within said ATF duration;

means for using said tenth quantity to meet unmet demands related to the same member item as the member item for which said previously promised order relates to.

80. The computer system of claim 79, further comprising:

means for determining whether said previously promised order is based on an eleventh quantity scheduled to be available after said ATF duration;

means for using said tenth quantity to meet unmet demands related to any of said plurality of member items.

* * * * *

UNITED STATES PATENT AND TRADEMARK OFFICE
CERTIFICATE OF CORRECTION

PATENT NO.       : 7,668,762 B2                                                                Page 1 of 1
APPLICATION NO.  : 10/727525
DATED            : February 23, 2010
INVENTOR(S)      : Rajeev Jain et al.

It is certified that error appears in the above-identified patent and that said Letters Patent is hereby corrected as shown below:

Drawings
On Sheet 3 of 14, in Reference Numeral 330, in Figure 3, line 2, delete "ATFduration" and insert -- ATF duration --, therefor.

On Sheet 5 of 14, below Reference Numeral 459, in Figure 4B, line 1, below "Reference Numeral 459" delete "  "    and insert --  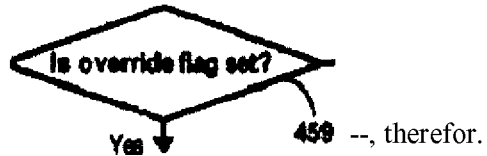 --, therefor.

In column 1, line 12, delete "Jain et al" and insert -- Jain et al. --, therefor.

In column 15, line 17, delete "be," and insert -- be --, therefor.

Signed and Sealed this

Twelfth Day of October, 2010

David J. Kappos
*Director of the United States Patent and Trademark Office*